(12) United States Patent
Asami

(10) Patent No.: US 7,982,976 B2
(45) Date of Patent: Jul. 19, 2011

(54) IMAGING LENS AND IMAGING APPARATUS

(75) Inventor: Taro Asami, Saitama (JP)

(73) Assignee: Fujinon Corporation, Saitama (JP)

( * ) Notice: Subject to any disclaimer, the term of this patent is extended or adjusted under 35 U.S.C. 154(b) by 601 days.

(21) Appl. No.: 12/053,410

(22) Filed: Mar. 21, 2008

(65) Prior Publication Data

US 2008/0239515 A1  Oct. 2, 2008

(30) Foreign Application Priority Data

Mar. 30, 2007  (JP) ................................ P2007-093304

(51) Int. Cl.
*G02B 9/34* (2006.01)

(52) U.S. Cl. ........................................ 359/772; 359/773

(58) Field of Classification Search .................. 359/772, 359/773, 780, 680–682
See application file for complete search history.

(56) References Cited

U.S. PATENT DOCUMENTS

| | | | | |
|---|---|---|---|---|
| 4,251,131 A | * | 2/1981 | Tojo | ............................... 359/660 |
| 4,456,345 A | * | 6/1984 | Fujibayashi | .................. 359/708 |
| 5,243,468 A | * | 9/1993 | Ohtake | .......................... 359/740 |
| 7,787,196 B2 | * | 8/2010 | Asami et al. | ................... 359/772 |
| 2005/0046970 A1 | | 3/2005 | Amanai | |
| 2006/0056066 A1 | | 3/2006 | Fujisaki et al. | |

FOREIGN PATENT DOCUMENTS

| | | |
|---|---|---|
| JP | 2-181716 A | 7/1990 |
| JP | 6-222267 A | 8/1994 |
| JP | 2006-64829 A | 3/2006 |
| JP | 2006-91715 A | 4/2006 |
| JP | 2006-91718 A | 4/2006 |

OTHER PUBLICATIONS

European Communication mailed Jun. 15, 2010 for Application No. 08005182.4.

* cited by examiner

*Primary Examiner* — Scott J Sugarman
(74) *Attorney, Agent, or Firm* — Birch, Stewart, Kolasch & Birch, LLP

(57) ABSTRACT

An imaging lens is provided and includes: in order from an object side of the imaging lens, a first lens group having a positive power as a whole; a second lens group including a lens in the most object side thereof, the lens having a concave surface on the object side thereof; a third lens group including a cemented lens of a lens having a positive power and a lens having a negative power; and a fourth lens group having a negative power as a whole.

19 Claims, 43 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

EXAMPLE 16

FIG. 17

| | EXAMPLE 1· BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | υdj (ABBE NUMBER) |
| G1 | 1 | 10.38 | 3.00 | 1.8348 | 42.7 |
| G1 | 2 | 26.46 | 0.23 | | |
| | 3 (APERTURE DIAPHRAGM) | — | 1.25 | | |
| G2 | 4 | −9.03 | 3.01 | 1.7440 | 44.8 |
| G2 | 5 | −4.91 | 2.79 | 1.8467 | 23.8 |
| G2 | 6 | −8.70 | 0.27 | | |
| G3 | 7 | 11.38 | 4.42 | 1.8340 | 37.2 |
| G3 | 8 | −6.51 | 1.26 | 1.9229 | 18.9 |
| G3 | 9 | −23.77 | 0.50 | | |
| G4 | 10 | −9.45 | 0.80 | 1.5174 | 52.4 |
| G4 | 11 | 9.45 | 4.46 | | |
| | IMG | — | 0.00 | | |

FIG. 18

| EXAMPLE 2 · BASIC LENS DATA |||||
|---|---|---|---|---|
| Si (SURFACE NUMBER) | Ri (RADIUS OF CURVATURE) | Di (SURFACE SPACING) | Ndj (REFRACTIVE INDEX) | $\nu dj$ (ABBE NUMBER) |
| G1: 1 | 9.88 | 4.00 | 1.8348 | 42.7 |
| G1: 2 | 9.59 | 0.80 | | |
| 3 (APERTURE DIAPHRAGM) | — | 0.70 | | |
| G2: 4 | -6.07 | 2.01 | 1.8467 | 23.8 |
| G2: 5 | -9.48 | 1.74 | 1.8340 | 37.2 |
| G2: 6 | -7.64 | 0.27 | | |
| G3: 7 | 11.37 | 4.40 | 1.8348 | 42.7 |
| G3: 8 | -8.10 | 1.60 | 1.9229 | 18.9 |
| G3: 9 | -44.52 | 0.99 | | |
| G4: 10 | -9.62 | 1.00 | 1.8348 | 42.7 |
| G4: 11 | -12.05 | 6.86 | | |
| GC: 12 | ∞ | 1.00 | 1.5168 | 64.2 |
| GC: 13 | ∞ | 0.25 | | |
| IMG | — | 0.00 | | |

FIG. 19

| EXAMPLE 3· BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| G1 { 1 | 11.18 | 3.00 | 1.8830 | 40.8 |
| 2 | 33.58 | 0.20 | | |
| 3 (APERTURE DIAPHRAGM) | — | 1.30 | | |
| G2 { 4 | -14.00 | 6.30 | 1.7130 | 53.9 |
| 5 | -4.95 | 2.36 | 1.9229 | 18.9 |
| 6 | -9.00 | 0.27 | | |
| G3 { 7 | 11.40 | 4.45 | 1.8340 | 37.2 |
| 8 | -15.02 | 1.20 | 1.8467 | 23.8 |
| 9 | -46.33 | 0.50 | | |
| G4 { 10 | -11.00 | 0.80 | 1.8040 | 46.6 |
| 11 | 11.00 | 3.49 | | |
| IMG | — | 0.00 | | |

FIG. 20

| EXAMPLE 4- BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| G1 { 1 | 10.04 | 3.53 | 1.5168 | 64.2 |
| 2 | -100.00 | 0.52 | | |
| 3 (APERTURE DIAPHRAGM) | — | 1.30 | | |
| G2 { 4 | -7.82 | 3.11 | 1.7130 | 53.9 |
| 5 | -5.16 | 3.33 | 1.8467 | 23.8 |
| 6 | -8.12 | 0.27 | | |
| G3 { 7 | 10.47 | 4.45 | 1.8340 | 37.2 |
| 8 | -7.65 | 1.20 | 1.9229 | 18.9 |
| 9 | -80.21 | 0.50 | | |
| G4 { 10 | -10.23 | 0.80 | 1.5174 | 52.4 |
| 11 | 10.23 | 4.50 | | |
| IMG | — | 0.00 | | |

FIG. 21

| | Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|---|
| | \multicolumn{5}{c}{EXAMPLE 5 · BASIC LENS DATA} |
| G1 | 1 | 12.02 | 3.50 | 1.8348 | 42.7 |
| G1 | 2 | 19.60 | 1.01 | | |
| | 3 (APERTURE DIAPHRAGM) | — | 0.62 | | |
| G2 | 4 | −6.07 | 2.01 | 1.8467 | 23.8 |
| G2 | 5 | −62.04 | 1.60 | 1.8340 | 37.2 |
| G2 | 6 | −7.64 | 0.27 | | |
| G3 | 7 | 11.07 | 4.40 | 1.8348 | 42.7 |
| G3 | 8 | −13.20 | 1.60 | 2.1435 | 17.8 |
| G3 | 9 | −30.48 | 2.90 | | |
| G4 | 10 | −7.31 | 1.00 | 1.5174 | 52.4 |
| G4 | 11 | −96.01 | 2.84 | | |
| GC | 12 | ∞ | 1.00 | 1.5168 | 64.2 |
| GC | 13 | ∞ | 0.25 | | |
| | IMG | — | 0.00 | | |

FIG. 22

| | EXAMPLE 6 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
| G1 | 1 | 10.74 | 3.50 | 1.8348 | 42.7 |
| | 2 | 30.06 | 1.00 | | |
| | 3 (APERTURE DIAPHRAGM) | — | 1.16 | | |
| G2 | 4 | -8.39 | 3.58 | 2.1435 | 17.8 |
| | 5 | -13.10 | 2.00 | 1.8340 | 37.2 |
| | 6 | -9.09 | 0.27 | | |
| G3 | 7 | 10.38 | 3.21 | 1.8348 | 42.7 |
| | 8 | -10.05 | 3.33 | 1.9229 | 18.9 |
| | 9 | -256.61 | 0.68 | | |
| G4 | 10 | -10.53 | 1.00 | 1.8340 | 37.2 |
| | 11 | 81.09 | 2.85 | | |
| GC | 12 | ∞ | 1.00 | 1.5168 | 64.2 |
| | 13 | ∞ | 0.25 | | |
| | IMG | — | 0.00 | | |

FIG. 23

| EXAMPLE 7· BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 1 (APERTURE DIAPHRAGM) | — | 0.00 | | |
| 2 | 11.90 | 3.00 | 1.8348 | 42.7 |
| 3 | 49.37 | 1.50 | | |
| 4 | -10.23 | 4.08 | 1.7130 | 53.9 |
| 5 | -4.95 | 3.33 | 1.8467 | 23.8 |
| 6 | -8.86 | 0.27 | | |
| 7 | 10.83 | 4.45 | 1.8340 | 37.2 |
| 8 | -7.46 | 1.28 | 1.9229 | 18.9 |
| 9 | -24.84 | 0.50 | | |
| 10 | -11.00 | 0.80 | 1.8040 | 46.6 |
| 11 | 11.00 | 4.32 | | |
| IMG | — | 0.00 | | |

Groupings: G1 {2, 3}, G2 {4, 5, 6}, G3 {7, 8, 9}, G4 {10, 11}

FIG. 24

| | EXAMPLE 8 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| | 1 (APERTURE DIAPHRAGM) | — | 0.50 | | |
| G1 | 2 | 10.85 | 3.50 | 1.8348 | 42.7 |
| | 3 | 29.68 | 1.50 | | |
| G2 | 4 | −7.63 | 3.01 | 1.7440 | 44.8 |
| | 5 | −4.95 | 1.60 | 1.8467 | 23.8 |
| | 6 | −7.77 | 0.27 | | |
| G3 | 7 | 12.01 | 4.21 | 1.8340 | 37.2 |
| | 8 | −5.99 | 1.20 | 1.9229 | 18.9 |
| | 9 | −18.08 | 0.49 | | |
| G4 | 10 | −8.78 | 0.80 | 1.5174 | 52.4 |
| | 11 | 10.54 | 3.90 | | |
| GC | 12 | ∞ | 1.00 | 1.5168 | 64.2 |
| | 13 | ∞ | 0.27 | | |
| | IMG | — | 0.00 | | |

FIG. 25

| | Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|---|
| | \multicolumn{5}{c}{EXAMPLE 9 · BASIC LENS DATA} | | | | |
| | 1 (APERTURE DIAPHRAGM) | — | 0.00 | | |
| G1 | 2 | 10.71 | 3.50 | 1.8348 | 42.7 |
| | 3 | 21.48 | 1.50 | | |
| G2 | 4 | -7.82 | 3.01 | 1.8010 | 35.0 |
| | 5 | -4.78 | 1.91 | 1.8467 | 23.8 |
| | 6 | -8.37 | 0.27 | | |
| G3 | 7 | 11.22 | 4.40 | 1.8348 | 42.7 |
| | 8 | -8.73 | 1.60 | 1.9229 | 18.9 |
| | 9 | -158.05 | 0.71 | | |
| G4 | 10 | -9.82 | 1.00 | 1.5174 | 52.4 |
| | 11 | 50.33 | 3.84 | | |
| GC | 12 | ∞ | 1.00 | 1.5168 | 64.2 |
| | 13 | ∞ | 0.26 | | |
| | IMG | — | 0.00 | | |

FIG. 26

| | EXAMPLE 10 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| | 1 (APERTURE DIAPHRAGM) | — | 0.00 | | |
| G1 | 2 | 7.80 | 2.00 | 1.8348 | 42.7 |
| | 3 | 12.06 | 1.32 | | |
| G2 | 4 | -8.69 | 3.01 | 1.8010 | 35.0 |
| | 5 | -6.27 | 1.78 | 1.8467 | 23.8 |
| | 6 | -9.36 | 0.27 | | |
| G3 | 7 | 10.80 | 4.40 | 1.8348 | 42.7 |
| | 8 | -7.56 | 1.60 | 1.9229 | 18.9 |
| | 9 | -1094.85 | 0.86 | | |
| G4 | 10 | -7.54 | 1.00 | 1.5174 | 52.4 |
| | 11 | -72.98 | 3.82 | | |
| GC | 12 | ∞ | 1.00 | 1.5168 | 64.2 |
| | 13 | ∞ | 0.28 | | |
| | IMG | — | 0.00 | | |

FIG. 27

| EXAMPLE 11 · BASIC LENS DATA |||||
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 1 (APERTURE DIAPHRAGM) | — | 0.00 | | |
| 2 | 11.04 | 3.50 | 1.8348 | 42.7 |
| 3 | 20.96 | 1.50 | | |
| 4 | −6.70 | 3.76 | 1.8467 | 23.8 |
| 5 | −7.63 | 0.27 | | |
| 6 | 11.87 | 4.40 | 1.8348 | 42.7 |
| 7 | −6.41 | 2.85 | 1.9229 | 18.9 |
| 8 | −73.29 | 0.62 | | |
| 9 | −10.28 | 1.00 | 1.5174 | 52.4 |
| 10 | 389.26 | 3.82 | | |
| 11 | ∞ | 1.00 | 1.5168 | 64.2 |
| 12 | ∞ | 0.28 | | |
| IMG | — | 0.00 | | |

G1: surfaces 2, 3
G2: surfaces 4, 5
G3: surfaces 6, 7, 8
G4: surfaces 9, 10
GC: surfaces 11, 12

FIG. 28

| EXAMPLE 12 · BASIC LENS DATA ||||| 
|---|---|---|---|---|
| Si (SURFACE NUMBER) | Ri (RADIUS OF CURVATURE) | Di (SURFACE SPACING) | Ndj (REFRACTIVE INDEX) | υdj (ABBE NUMBER) |
| 1 (APERTURE DIAPHRAGM) | — | 0.00 | | |
| 2 | 11.19 | 3.50 | 1.7725 | 49.6 |
| 3 | 23.37 | 2.00 | | |
| 4 | -10.17 | 3.50 | 1.9229 | 18.9 |
| 5 | -18.17 | 0.27 | | |
| 6 | 9.66 | 4.51 | 1.8348 | 42.7 |
| 7 | -5.99 | 2.08 | 1.8467 | 23.8 |
| 8 | -13.04 | 1.64 | | |
| 9 | -5.38 | 1.00 | 1.7215 | 29.2 |
| 10 | -21.68 | 2.69 | | |
| 11 | ∞ | 1.00 | 1.5168 | 64.2 |
| 12 | ∞ | 0.29 | | |
| IMG | — | 0.00 | | |

Groups: G1 {2,3}, G2 {4,5}, G3 {6,7,8}, G4 {9,10}, GC {11,12}

FIG. 29

| | EXAMPLE 13 · BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | υdj (ABBE NUMBER) |
| | 1 (APERTURE DIAPHRAGM) | — | 0.00 | | |
| G1 | 2 | 10.87 | 3.50 | 1.7725 | 49.6 |
| | 3 | 30.51 | 2.00 | | |
| G2 | 4 | -10.38 | 3.50 | 1.9229 | 18.9 |
| | 5 | -18.35 | 0.47 | | |
| G3 | 6 | 10.70 | 4.51 | 1.8348 | 42.7 |
| | 7 | -5.99 | 1.60 | 1.8467 | 23.8 |
| | 8 | -14.17 | 1.89 | | |
| G4 | 9 | -5.68 | 1.00 | 1.7464 | 44.7 |
| | 10 | -24.43 | 2.26 | | |
| GC | 11 | ∞ | 1.00 | 1.5168 | 64.2 |
| | 12 | ∞ | 0.25 | | |
| | IMG | — | 0.00 | | |

FIG. 30

| EXAMPLE 14 · BASIC LENS DATA ||||| 
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 1 (APERTURE DIAPHRAGM) | — | 0.00 | | |
| G1: 2 | 11.04 | 3.50 | 1.7725 | 49.6 |
| G1: 3 | 30.19 | 2.00 | | |
| G2: 4 | −10.01 | 3.50 | 1.9229 | 18.9 |
| G2: 5 | −18.03 | 0.27 | | |
| G3: 6 | 10.10 | 4.43 | 1.8348 | 42.7 |
| G3: 7 | −5.99 | 1.60 | 1.8467 | 23.8 |
| G3: 8 | −12.60 | 1.69 | | |
| G4: 9 | −5.34 | 1.00 | 1.7215 | 29.2 |
| G4: 10 | −29.89 | 2.46 | | |
| GC: 11 | ∞ | 1.00 | 1.5168 | 64.2 |
| GC: 12 | ∞ | 0.27 | | |
| IMG | — | 0.00 | | |

FIG. 31

| EXAMPLE 15 BASIC LENS DATA ||||||
|---|---|---|---|---|---|
| | Si (SURFACE NUMBER) | Ri (RADIUS OF CURVATURE) | Di (SURFACE SPACING) | Ndj (REFRACTIVE INDEX) | υdj (ABBE NUMBER) |
| G1 | 1 | 10.64 | 3.00 | 1.7725 | 49.6 |
| | 2 | 29.99 | 1.00 | | |
| | 3 (APERTURE DIAPHRAGM) | — | 1.25 | | |
| G2 | 4 | −10.17 | 3.50 | 1.9229 | 18.9 |
| | 5 | −18.16 | 0.27 | | |
| G3 | 6 | 10.44 | 4.51 | 1.8348 | 42.7 |
| | 7 | −5.99 | 1.60 | 1.8467 | 23.8 |
| | 8 | −12.08 | 1.63 | | |
| G4 | 9 | −5.36 | 1.00 | 1.7215 | 29.2 |
| | 10 | −36.07 | 2.48 | | |
| GC | 11 | ∞ | 1.00 | 1.5168 | 64.2 |
| | 12 | ∞ | 0.27 | | |
| | IMG | — | 0.00 | | |

FIG. 32

| EXAMPLE 16 · BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | υdj (ABBE NUMBER) |
| G1: 1 | 13.54 | 3.50 | 1.8348 | 42.7 |
| G1: 2 | 29.21 | 0.83 | | |
| 3 (APERTURE DIAPHRAGM) | — | 0.70 | | |
| G2: 4 | -6.00 | 3.61 | 1.8467 | 23.8 |
| G2: 5 | -7.64 | 0.27 | | |
| G3: 6 | 13.36 | 4.40 | 1.8348 | 42.7 |
| G3: 7 | -6.55 | 1.60 | 1.9229 | 18.9 |
| G3: 8 | -22.62 | 3.00 | | |
| G4: 9 | -8.85 | 1.00 | 1.5174 | 52.4 |
| G4: 10 | 49.43 | 2.86 | | |
| GC: 11 | ∞ | 1.00 | 1.5168 | 64.2 |
| GC: 12 | ∞ | 0.25 | | |
| IMG | — | 0.00 | | |

FIG. 33

| | CONFIGURATION | | ABSOLUTE VALUE OF CONDITIONAL EXPRESSION | | | | | | | |
|---|---|---|---|---|---|---|---|---|---|---|
| | THE NUMBER OF LENSES | STOP POSITION | $\|f_2/f\|$ (1) | $\|R_{2A}/R_{2B}\|$ (2) | $\|ENP\|/L$ (3) | $N_n - N_p$ (4) | $\nu_p/\nu_n$ (5) | $f_4/f$ (6) | $f_1/f$ (7) | $f_3/f$ (8) | $X/L$ (9) |
| EXAMPLE 1 | 6 | BETWEEN G1 AND G2 | 4.07 | 1.04 | 0.10 | 0.09 | 1.97 | -0.75 | 1.57 | 0.90 | 0.32 |
| EXAMPLE 2 | 6 | BETWEEN G1 AND G2 | 36.72 | 0.79 | 0.15 | 0.09 | 2.26 | -5.52 | 5.86 | 0.98 | 0.32 |
| EXAMPLE 3 | 6 | BETWEEN G1 AND G2 | 2.37 | 1.56 | 0.09 | 0.01 | 1.56 | -0.53 | 1.41 | 0.91 | 0.30 |
| EXAMPLE 4 | 6 | BETWEEN G1 AND G2 | 3.59 | 0.96 | 0.14 | 0.09 | 1.97 | -0.80 | 1.46 | 1.04 | 0.33 |
| EXAMPLE 5 | 6 | BETWEEN G1 AND G2 | 370.76 | 0.79 | 0.16 | 0.31 | 2.40 | -1.26 | 2.54 | 0.96 | 0.35 |
| EXAMPLE 6 | 6 | BETWEEN G1 AND G2 | 5.10 | 0.92 | 0.16 | 0.09 | 2.26 | -0.91 | 1.51 | 1.08 | 0.34 |
| EXAMPLE 7 | 6 | IN FRONT OF G1 | 2.87 | 1.15 | 0.00 | 0.09 | 1.97 | -0.53 | 1.44 | 0.83 | 0.26 |
| EXAMPLE 8 | 6 | IN FRONT OF G1 | 4.81 | 0.98 | 0.02 | 0.09 | 1.97 | -0.75 | 1.55 | 0.84 | 0.27 |
| EXAMPLE 9 | 6 | IN FRONT OF G1 | 4.82 | 0.94 | 0.00 | 0.09 | 2.26 | -1.28 | 1.81 | 1.15 | 0.27 |
| EXAMPLE 10 | 6 | IN FRONT OF G1 | 6.46 | 1.39 | 0.00 | 0.09 | 2.26 | -1.32 | 1.77 | 1.18 | 0.29 |
| EXAMPLE 11 | 5 | IN FRONT OF G1 | 6.13 | 0.88 | 0.00 | 0.09 | 2.26 | -1.57 | 1.95 | 1.18 | 0.27 |
| EXAMPLE 12 | 5 | IN FRONT OF G1 | 2.60 | 0.56 | 0.00 | 0.01 | 1.79 | -0.83 | 2.02 | 0.63 | 0.27 |
| EXAMPLE 13 | 5 | IN FRONT OF G1 | 2.65 | 0.57 | 0.00 | 0.01 | 1.79 | -0.82 | 1.64 | 0.67 | 0.28 |
| EXAMPLE 14 | 5 | IN FRONT OF G1 | 2.54 | 0.56 | 0.00 | 0.01 | 1.79 | -0.75 | 1.71 | 0.63 | 0.28 |
| EXAMPLE 15 | 5 | BETWEEN G1 AND G2 | 2.62 | 0.56 | 0.16 | 0.09 | 2.26 | -0.73 | 1.65 | 0.64 | 0.37 |
| EXAMPLE 16 | 5 | BETWEEN G1 AND G2 | 269.34 | 0.79 | 0.14 | 0.09 | 2.26 | -1.20 | 2.28 | 0.99 | 0.34 |

EXAMPLE 1

EXAMPLE 2

EXAMPLE 3

EXAMPLE 4

EXAMPLE 5

EXAMPLE 6

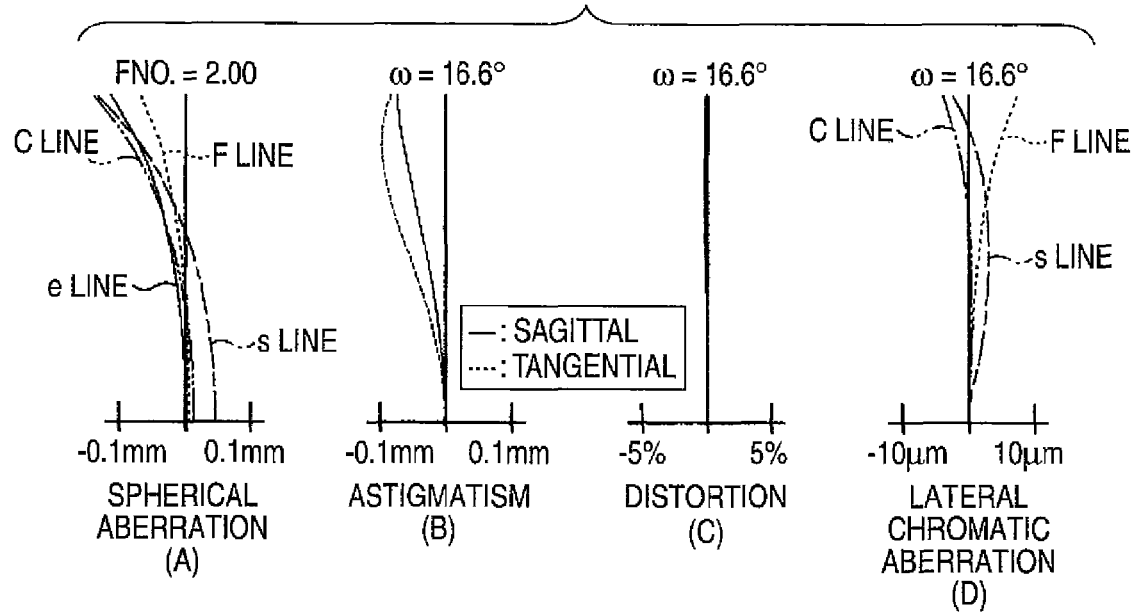
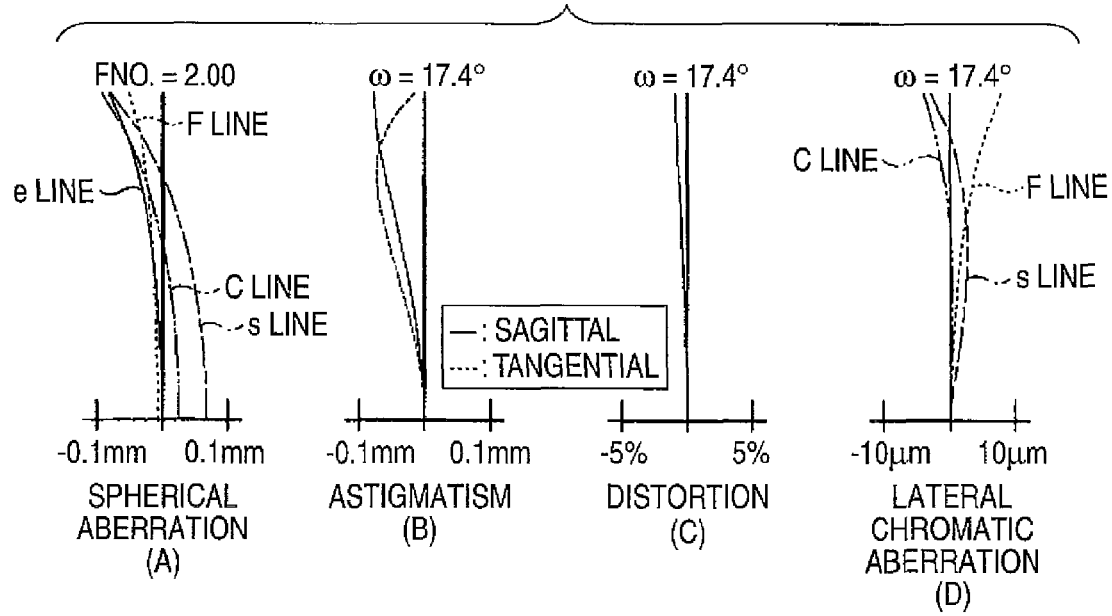

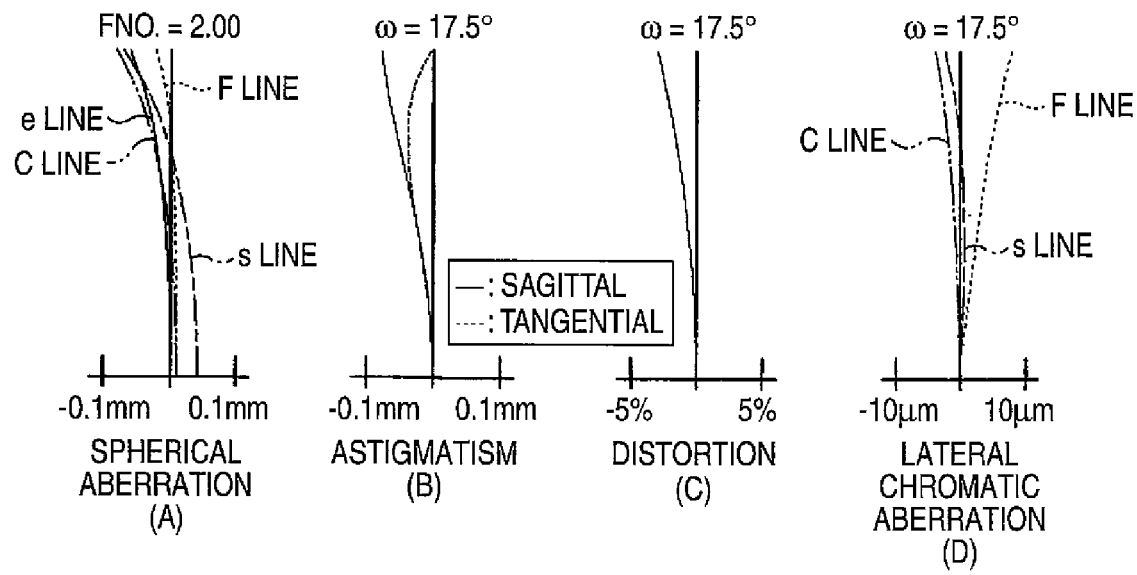
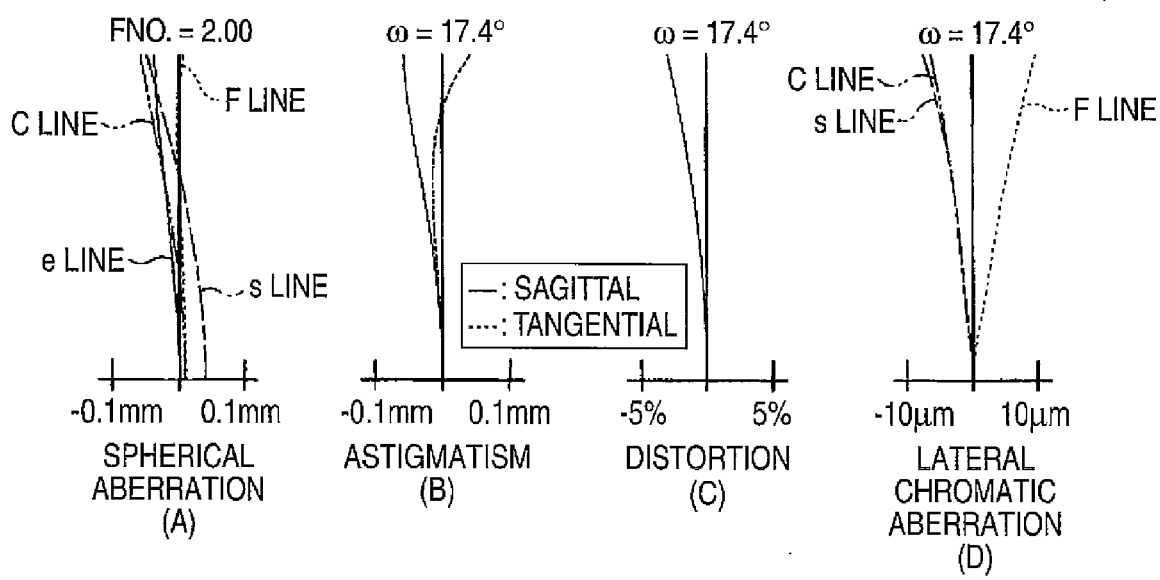

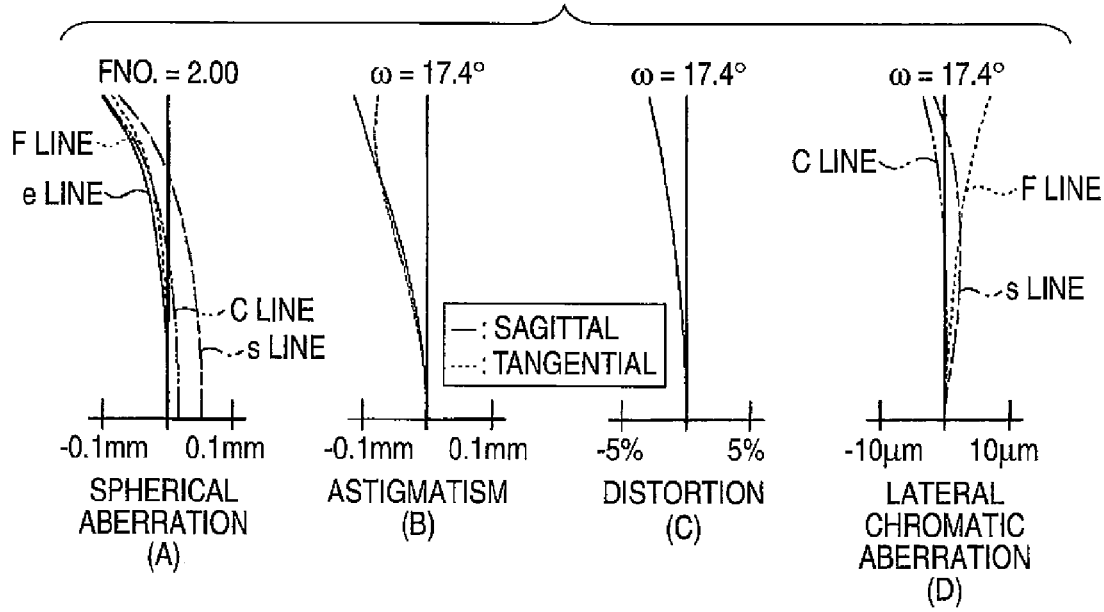
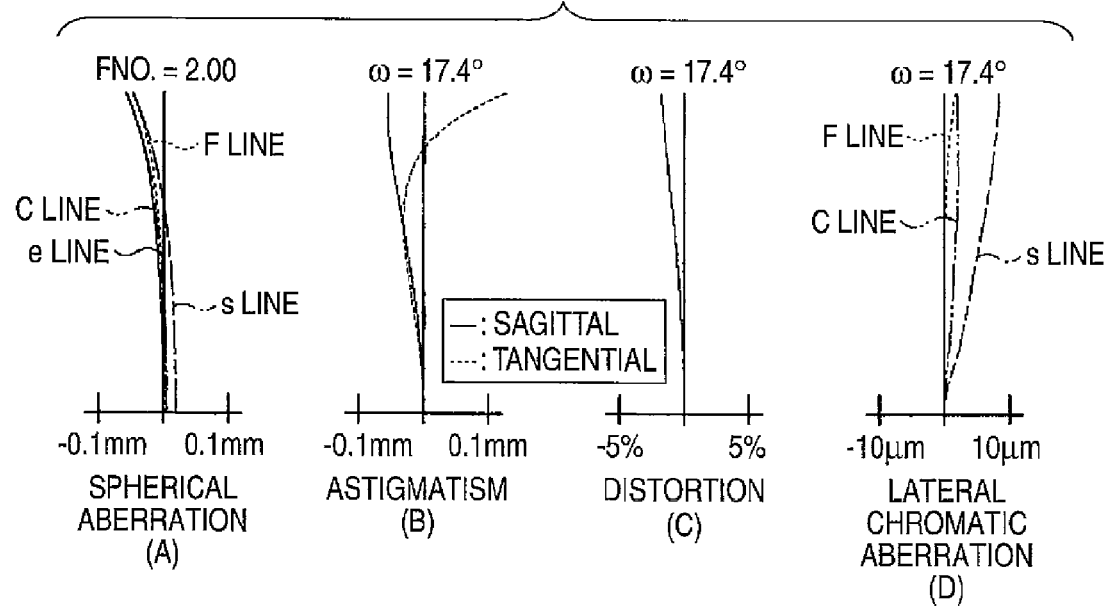

EXAMPLE 13

EXAMPLE 14

EXAMPLE 15

EXAMPLE 16

IMAGING LENS AND IMAGING APPARATUS

BACKGROUND OF THE INVENTION

1. Field of the Invention

The present invention relates to an imaging lens system to be used in various imaging apparatuses using an imaging device such as a CCD (Charge Coupled Device) or a CMOS (Complementary Metal Oxide Semiconductor), for example, an onboard camera and a monitoring camera, and more particularly to an imaging lens and an imaging apparatus which are suitable for an onboard camera for imaging a video in a front, side or rear part of a car.

2. Description of Related Art

In recent years, an imaging device such as a CCD or a CMOS has greatly progressed a reduction in sizes and an enhancement in a pixel. For this reason, it has also been demanded to reduce a size and a weight for an imaging apparatus body and a lens to be loaded thereon. On the other hand, an onboard camera or a monitoring camera is required to have a high resistance to climate, for example and to be capable of being used within a wide temperature range from an inner part of a car in a tropical area in midsummer to outside air in a cold district, and also is required to have a small size and a high performance. In particular, it has been demanded that a camera disposed in an inner part of a car and serving to monitor a forward part can be used in a wide waveband from a visible range to a near infrared region. JP-A-2006-64829, JP-A-2006-91715 and JP-A-2006-91718 have disclosed a telephoto lens system of a 4-group configuration including a first lens group having a positive power, a second lens group having a positive or negative power, a third lens group having a negative power, and a fourth lens group having a positive power in order from an object side, which can be used in the waveband from the visible range to the near infrared region. In the lens systems described in JP-A-2006-64829, JP-A-2006-91715 and JP-A-2006-91718, a lens in the most object side of the second lens group has a convex surface on the object side. A stop is disposed between the third and fourth lens groups.

In addition to the performance above, in the case where the lens is particularly used as an onboard camera, it is also demanded that a lens portion exposed to an outside is small in order to protect an appearance of a car at the same time. In the lens systems described in JP-A-2006-64829, JP-A-2006-91715 and JP-A-2006-91718, the first lens group has a large diameter and has an insufficiency of a reduction in a size.

SUMMARY OF THE INVENTION

An object of an illustrative, non-limiting embodiment of the invention is to provide an imaging lens and an imaging apparatus, which can obtain a suitable reduction in sizes and weights for an onboard camera while holding an excellent optical performance.

According to an aspect of the invention, there is provided an imaging lens including: in order from an object side of the imaging lens, a first lens group having a positive power as a whole; a second lens group including a lens in the most object side thereof, the lens having a concave surface on the object side thereof; a third lens group including a cemented lens of a lens having a positive power and a lens having a negative power; and a fourth lens group having a negative power as a whole.

In the imaging lens, the configurations of the respective lens groups are made proper in the lens system having the 4-group configuration as a whole, and thus, it is possible to easily obtain an advantageous performance to a reduction in a size and a weight while holding an excellent optical performance. In particular, the surface on the object side of the lens in the most object side of the second lens group is set to be concave toward the object side so that a field curvature is corrected well. At the same time, an off-axis beam is refracted along an optical axis so that a size in a radial direction of the lens system is reduced. Moreover, the third lens group is set to be the cemented lens of a lens having a positive power and a lens having a negative power. Therefore, a chromatic aberration is corrected well in a wide waveband from a visible range to a near infrared region.

By properly employing and satisfying the following preferable configuration, furthermore, it is possible to cause an optical performance to be more excellent and to reduce a size and a weight.

In the imaging lens, a surface on an image side of a lens in the most image side of the second lens group may be convex toward the image side. Consequently, it is possible to correct the field curvature further well.

Moreover, the imaging lens can have a 4-group 6-lens configuration or a 4-group 5-lens configuration, for example. In case of the 4-group 6-lens configuration, the first lens group may be constituted by a lens having a convex surface on the object side and having a positive power, the second lens group may be constituted by a cemented lens of a lens having a concave surface on the object side and a lens having a convex surface on the image side in order from the object side, and the fourth lens group may be constituted by a lens having a concave surface on the object side and having a negative power. In the lens system having the 4-group 6-lens configuration, consequently, each lens structure can be optimized more greatly and a more excellent optical performance can be held, and at the same time, a greater advantage to a reduction in a size and a weight can be obtained.

In the case of the 4-group 5-lens configuration, the first lens group may be constituted by a lens having a convex surface on the object side and having a positive power, the second lens group may be constituted by a meniscus lens having a concave surface on the object side, and the fourth lens group may be constituted by a lens having a concave surface on the object side and having a negative power. In the lens system having the 4-group 5-lens configuration, consequently, each lens structure can be optimized more greatly and a more excellent optical performance can be held, and at the same time, a greater advantage to a reduction in a size and a weight can be obtained.

Moreover, the imaging lens may satisfy the following conditions. Consequently, the configuration of the second lens group can be optimized and can be advantageous to a correction of various aberrations.

$$2.0 < |f2/f| \tag{1}$$

$$0.3 < |R_{2A}/R_{2B}| < 2 \tag{2}$$

wherein f represents a focal length of the whole system (the imaging lens), f2 represents a focal length of the second lens group, $R_{2A}$ represents a radius of curvature of a surface on the most object side of the second lens group, and $R_{2B}$ represents a radius of curvature of a surface on the most image side of the second lens group.

Moreover, the second lens group may include a lens having a negative power and an Abbe number of the lens at the d-line may be equal to or smaller than 40. Consequently, the invention is advantageous to a correction of a chromatic aberration.

In the imaging lens, furthermore, a stop may be disposed on the object side from the second lens group. By disposing the stop on the object side from the second lens group, it is possible to bring an entrance pupil position to a forward part while correcting the various aberrations well and to reduce an area of exposure of the lens.

In addition, the following condition may be satisfied. Consequently, it is possible to reduce a diameter of a portion exposed to the outside of the first lens.

$$|ENP|/L < 0.5 \qquad (3)$$

wherein ENP represents a distance from a surface apex on the most object side of the first lens group to an entrance pupil of the first lens, and L represents a distance from the surface on the most object side of the first lens group to an imaging surface.

The following conditions may be satisfied when the lens having the positive power in the cemented lens is a biconvex lens and a refractive index and an Abbe number of the biconvex lens at the d-line are represented by Np and vp respectively, and a refractive index and an Abbe number of the lens having the negative power in the cemented lens at the d-line are represented by Nn and vn respectively in the third lens group. Consequently, the chromatic aberration can be corrected advantageously.

$$Nn-Np < 0.40 \qquad (4)$$

$$vp/vn > 1.0 \qquad (5)$$

Moreover, the following condition may be satisfied. Consequently, a focal length of the fourth lens group can be optimized and can be advantageous to the correction of the various aberrations.

$$-6.0 < f4/f < -0.2 \qquad (6)$$

wherein f represents a focal length of the whole system, and f4 represents a focal length of the fourth lens group.

According to an aspect of the invention, there is provided an imaging apparatus including an imaging lens according to an aspect of the invention, and an imaging device for outputting an imaging signal corresponding to an optical image formed by the imaging lens.

According to the imaging apparatus, it is possible to produce an imaging signal having a high resolution based on an optical image having a high resolution which is obtained by the imaging lens according to the invention.

BRIEF DESCRIPTION OF THE DRAWINGS

The features of the invention will appear more fully upon consideration of the exemplary embodiment of the invention, which are schematically set forth in the drawings, in which:

FIG. 17 is a table showing lens data of the imaging lens according to Example 1;

FIG. 18 is a table showing lens data of the imaging lens according to Example 2;

FIG. 19 is a table showing lens data of the imaging lens according to Example 3;

FIG. 20 is a table showing lens data of the imaging lens according to Example 4;

FIG. 21 is a table showing lens data of the imaging lens according to Example 5;

FIG. 22 is a table showing lens data of the imaging lens according to Example 6;

FIG. 23 is a table showing lens data of the imaging lens according to Example 7;

FIG. 24 is a table showing lens data of the imaging lens according to Example 8;

FIG. 25 is a table showing lens data of the imaging lens according to Example 9;

FIG. 26 is a table showing lens data of the imaging lens according to Example 10;

FIG. 27 is a table showing lens data of the imaging lens according to Example 11;

FIG. 28 is a table showing lens data of the imaging lens according to Example 12;

FIG. 29 is a table showing lens data of the imaging lens according to Example 13;

FIG. 30 is a table showing lens data of the imaging lens according to Example 14;

FIG. 31 is a table showing lens data of the imaging lens according to Example 15;

FIG. 32 is a table showing lens data of the imaging lens according to Example 16;

FIG. 33 is a table collectively showing values related to conditional expressions for each of Examples;

FIG. 40 is an aberration chart showing various aberrations in the imaging lens according to Example 7, (A) showing a spherical aberration, (B) showing an astigmatism, (C) showing a distortion, and (D) showing a lateral chromatic aberration;

FIG. 41 is an aberration chart showing various aberrations in the imaging lens according to Example 8, (A) showing a spherical aberration, (B) showing an astigmatism, (C) showing a distortion, and (D) showing a lateral chromatic aberration;

FIG. 42 is an aberration chart showing various aberrations in the imaging lens according to Example 9, (A) showing a spherical aberration, (B) showing an astigmatism, (C) showing a distortion, and (D) showing a lateral chromatic aberration;

FIG. 43 is an aberration chart showing various aberrations in the imaging lens according to Example 10, (A) showing a spherical aberration, (B) showing an astigmatism, (C) showing a distortion, and (D) showing a lateral chromatic aberration;

FIG. 44 is an aberration chart showing various aberrations in the imaging lens according to Example 11, (A) showing a spherical aberration, (B) showing an astigmatism, (C) showing a distortion, and (D) showing a lateral chromatic aberration;

FIG. 45 is an aberration chart showing various aberrations in the imaging lens according to Example 12, (A) showing a spherical aberration, (B) showing an astigmatism, (C) showing a distortion, and (D) showing a lateral chromatic aberration;

DETAILED DESCRIPTION OF THE EXEMPLARY EMBODIMENTS

Although the invention will be described below with reference to exemplary embodiments thereof the following exemplary embodiments and modifications do not restrict the invention.

In an imaging lens according to an exemplary embodiment of the invention, the configuration of each lens group is optimized in the lens system having the 4-group configuration as a whole. Therefore, it is possible to implement a lens system having a reduction in a size and a weight which is suitable for an onboard camera while holding an excellent optical performance.

Moreover, in an imaging apparatus according to an exemplary embodiment of the invention, moreover, the imaging signal corresponding to the optical image formed by the imaging lens having a high performance according to the invention is output. Therefore, it is possible to obtain an imaging signal having a high resolution.

An exemplary embodiment according to the invention will be described below in detail with reference to the drawings.

Figure 1:
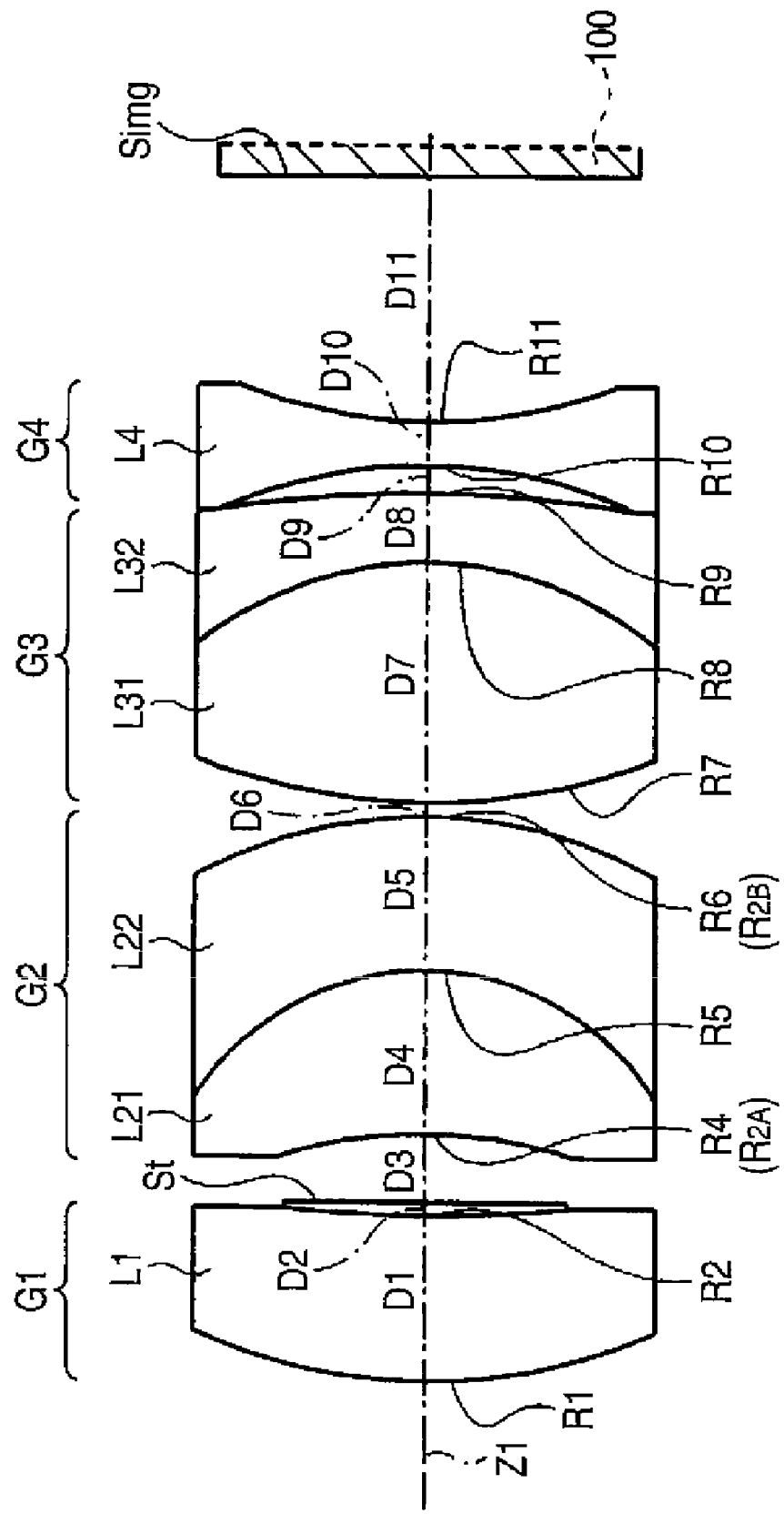
FIG. 1 is a sectional view showing a first structure example of an imaging lens according to an embodiment of the invention, illustrating a lens corresponding to Example 1.
Figure 2:
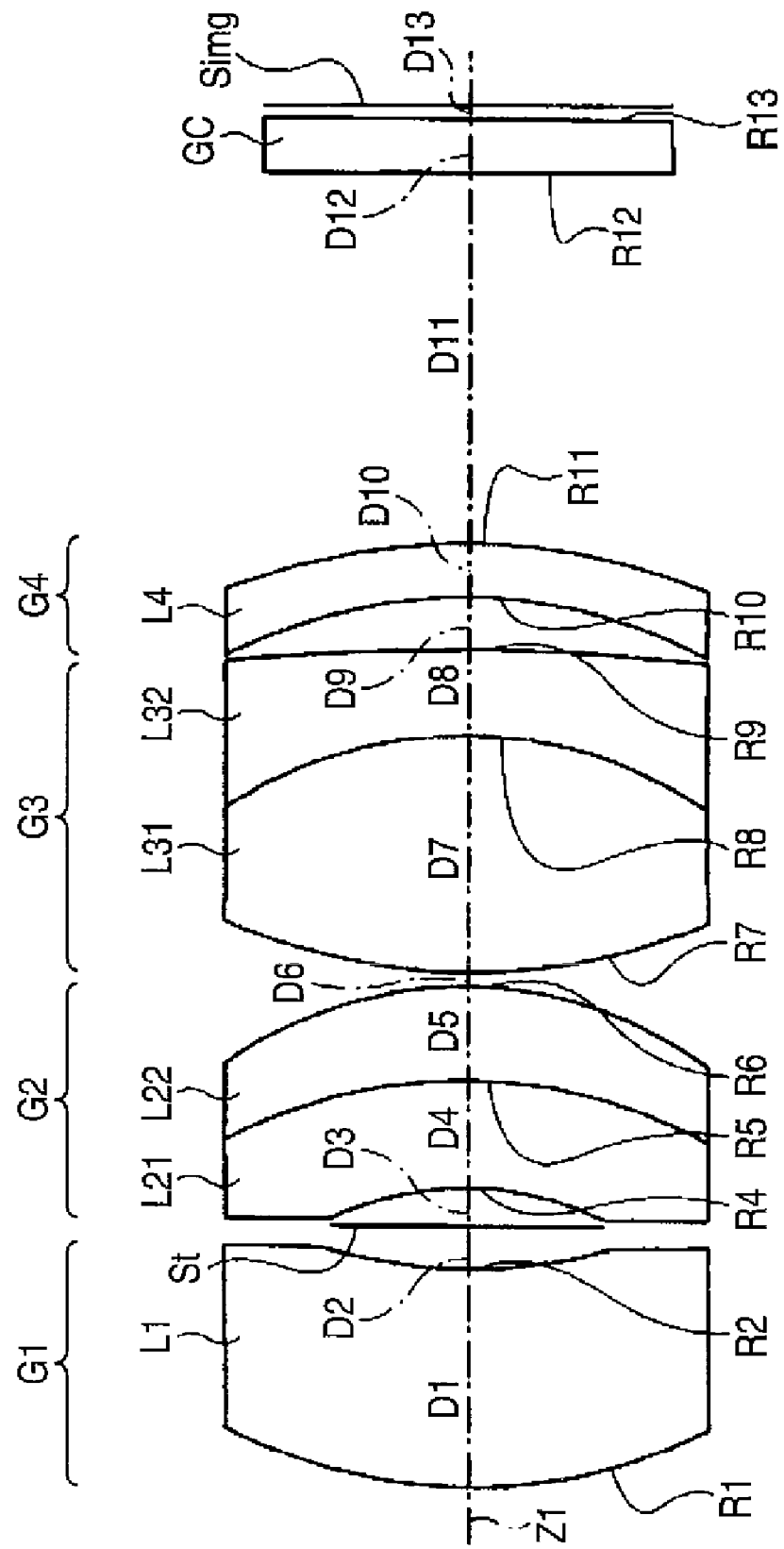
FIG. 2 is a sectional view showing a second structure example of the imaging lens according to an embodiment of the invention, illustrating a lens corresponding to Example 2.
Figure 3:
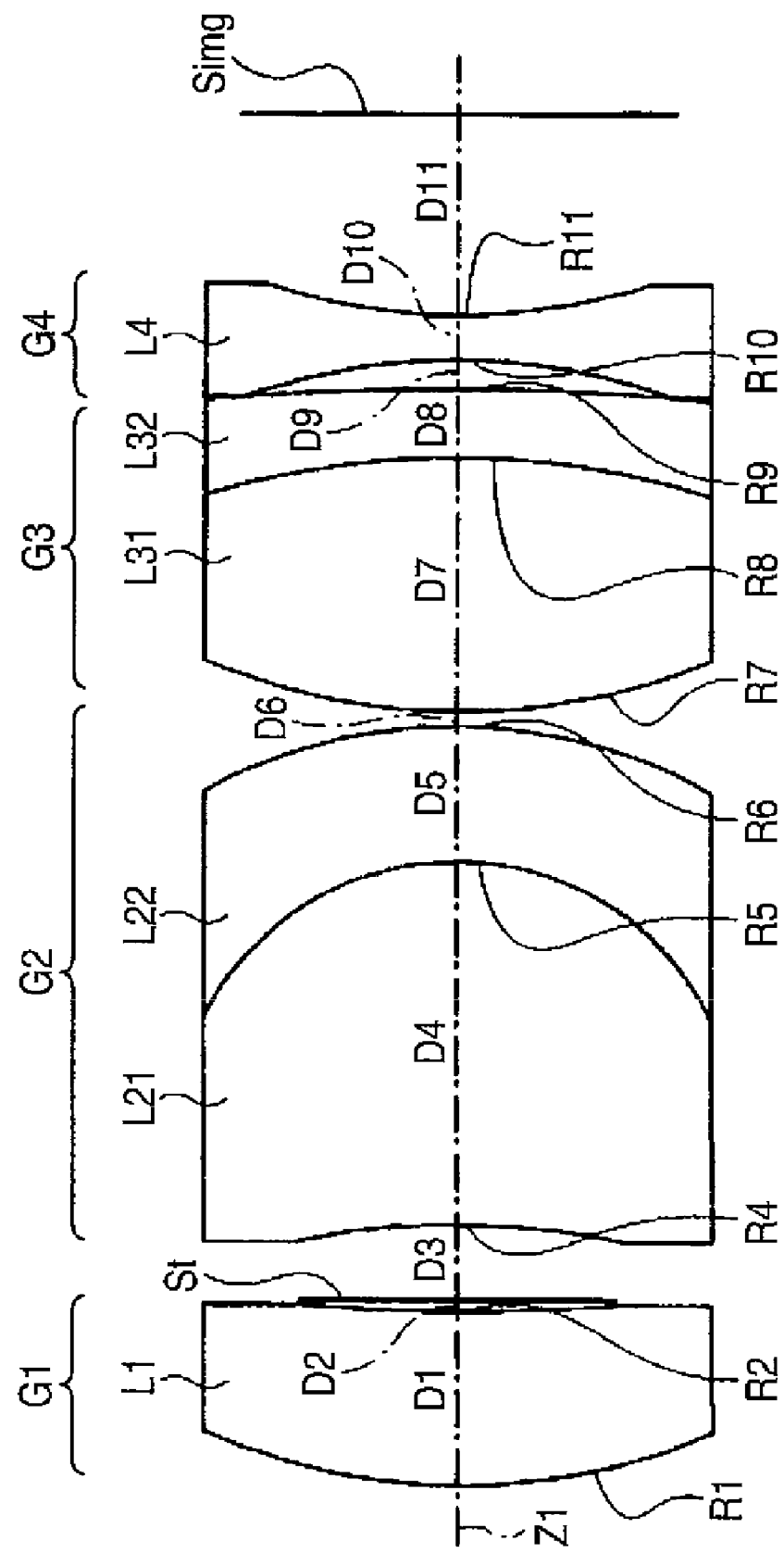
FIG. 3 is a sectional view showing a third structure example of the imaging lens according to an embodiment of the invention, illustrating a lens corresponding to Example 3.
Figure 4:
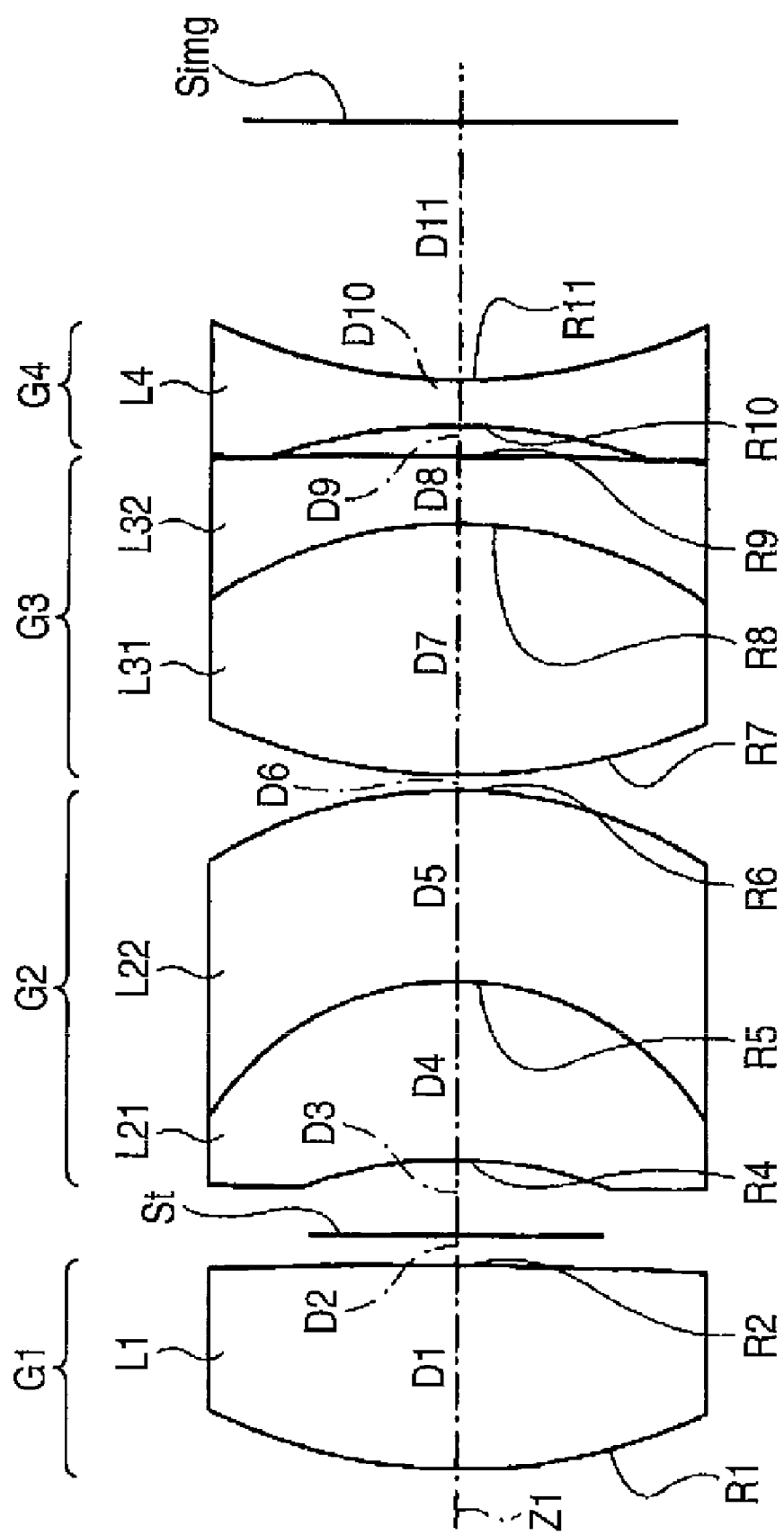
FIG. 4 is a sectional view showing a fourth structure example of the imaging lens according to an embodiment of the invention, illustrating a lens corresponding to Example 4.
Figure 5:
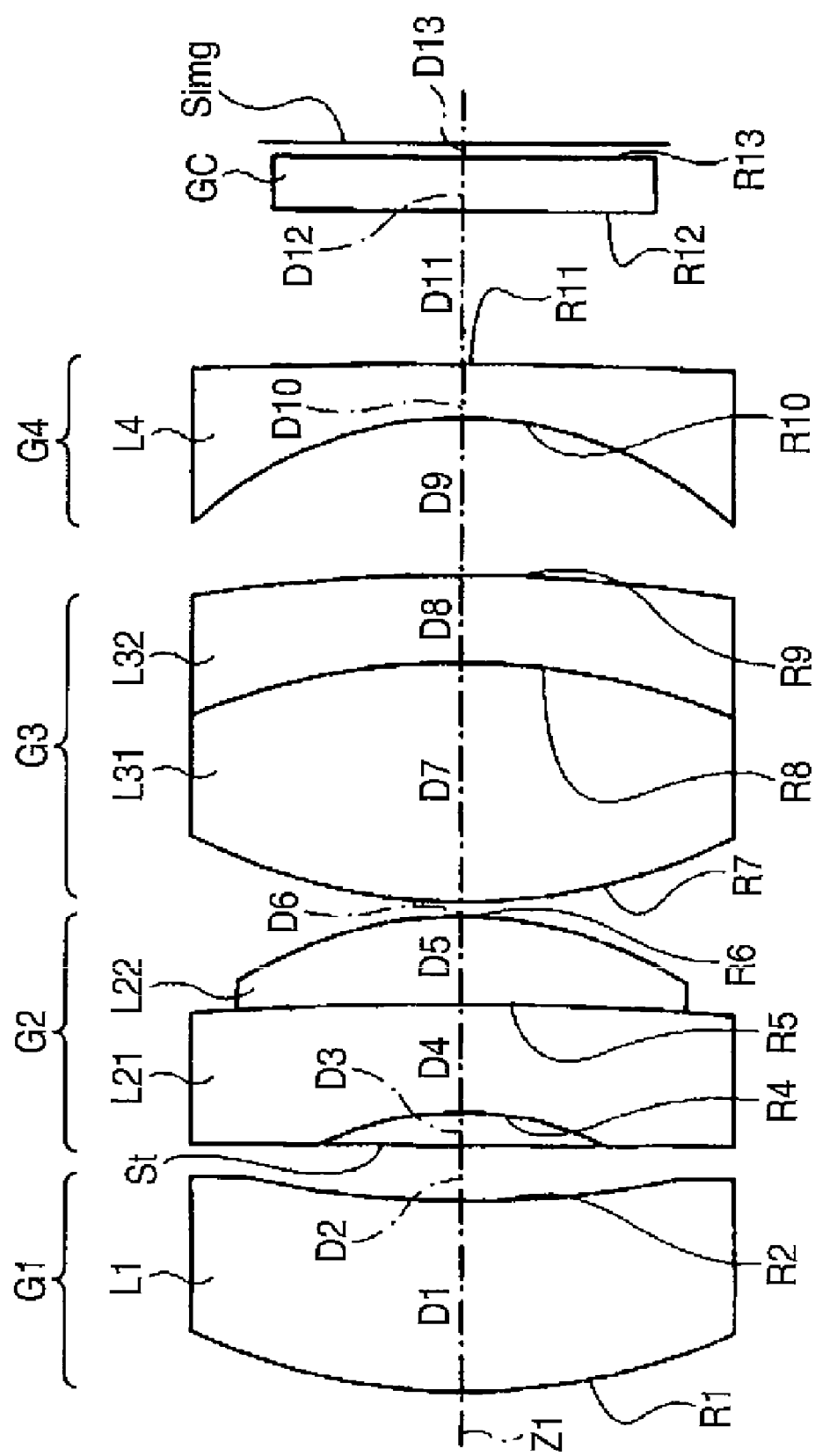
FIG. 5 is a sectional view showing a fifth structure example of the imaging lens according to an embodiment of the invention, illustrating a lens corresponding to Example 5.
Figure 6:
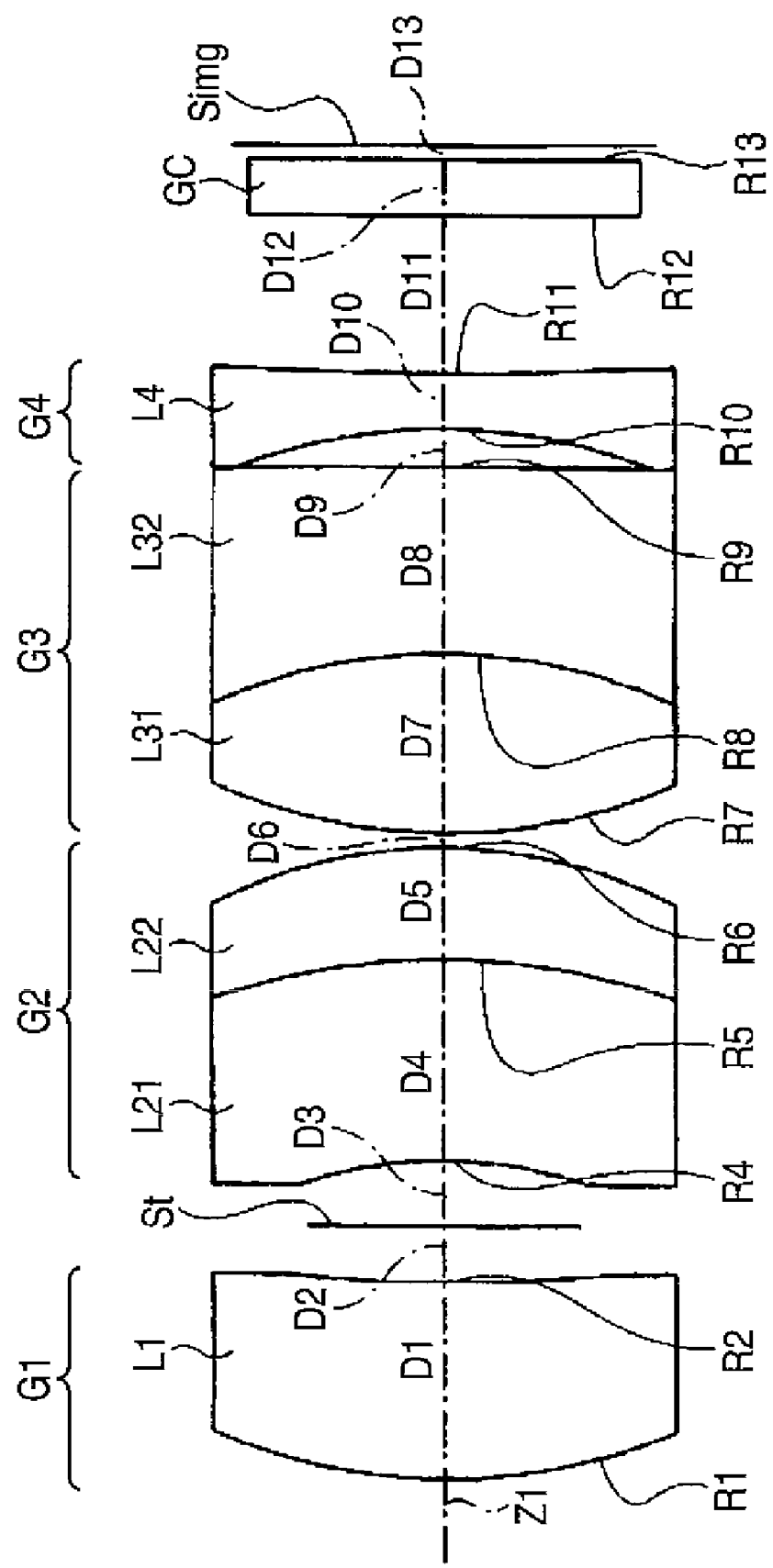
FIG. 6 is a sectional view showing a sixth structure example of the imaging lens according to an embodiment of the invention, illustrating a lens corresponding to Example 6.
Figure 7:
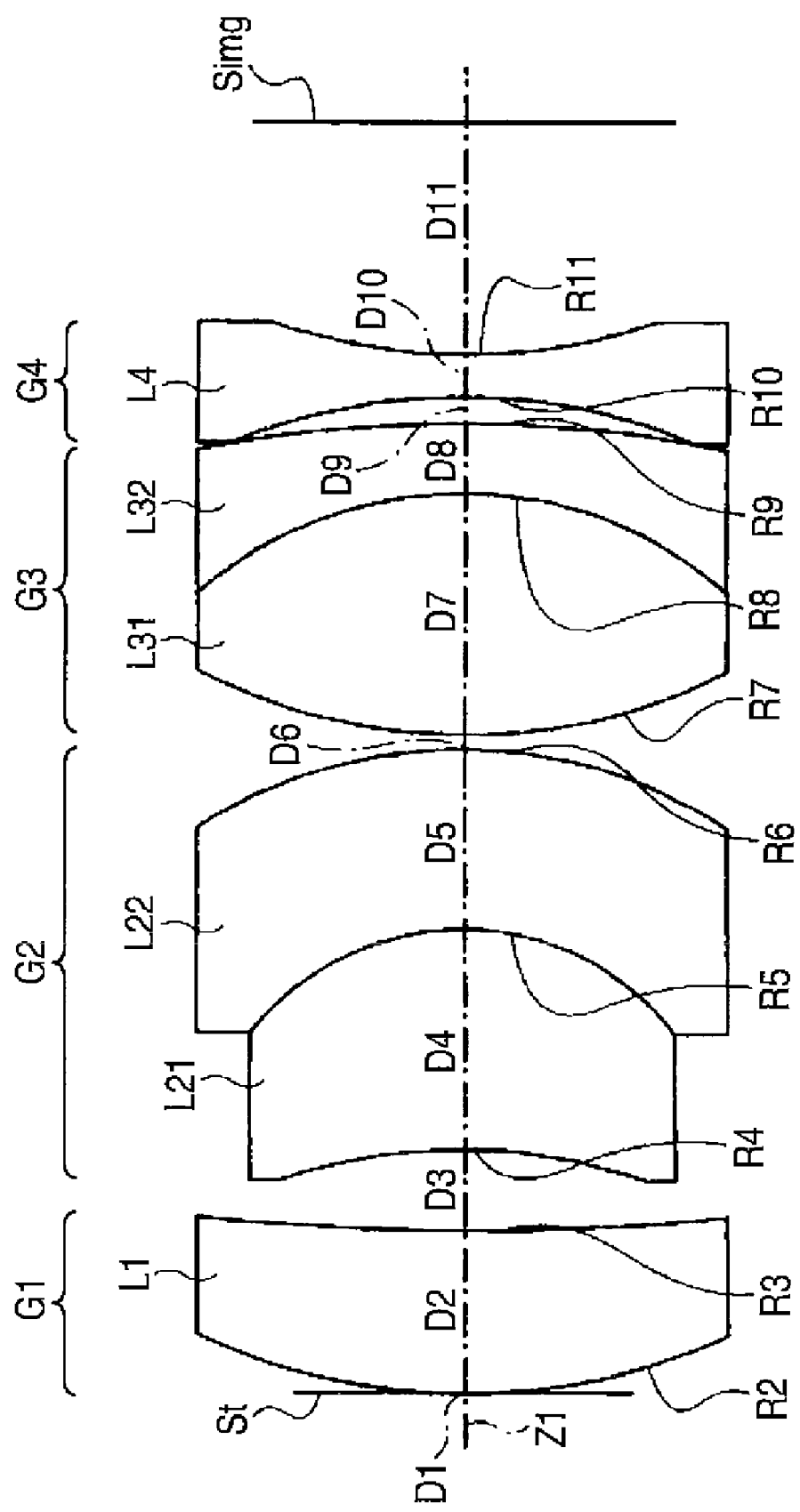
FIG. 7 is a sectional view showing a seventh structure example of the imaging lens according to an embodiment of the invention, illustrating a lens corresponding to Example 7.
Figure 8:
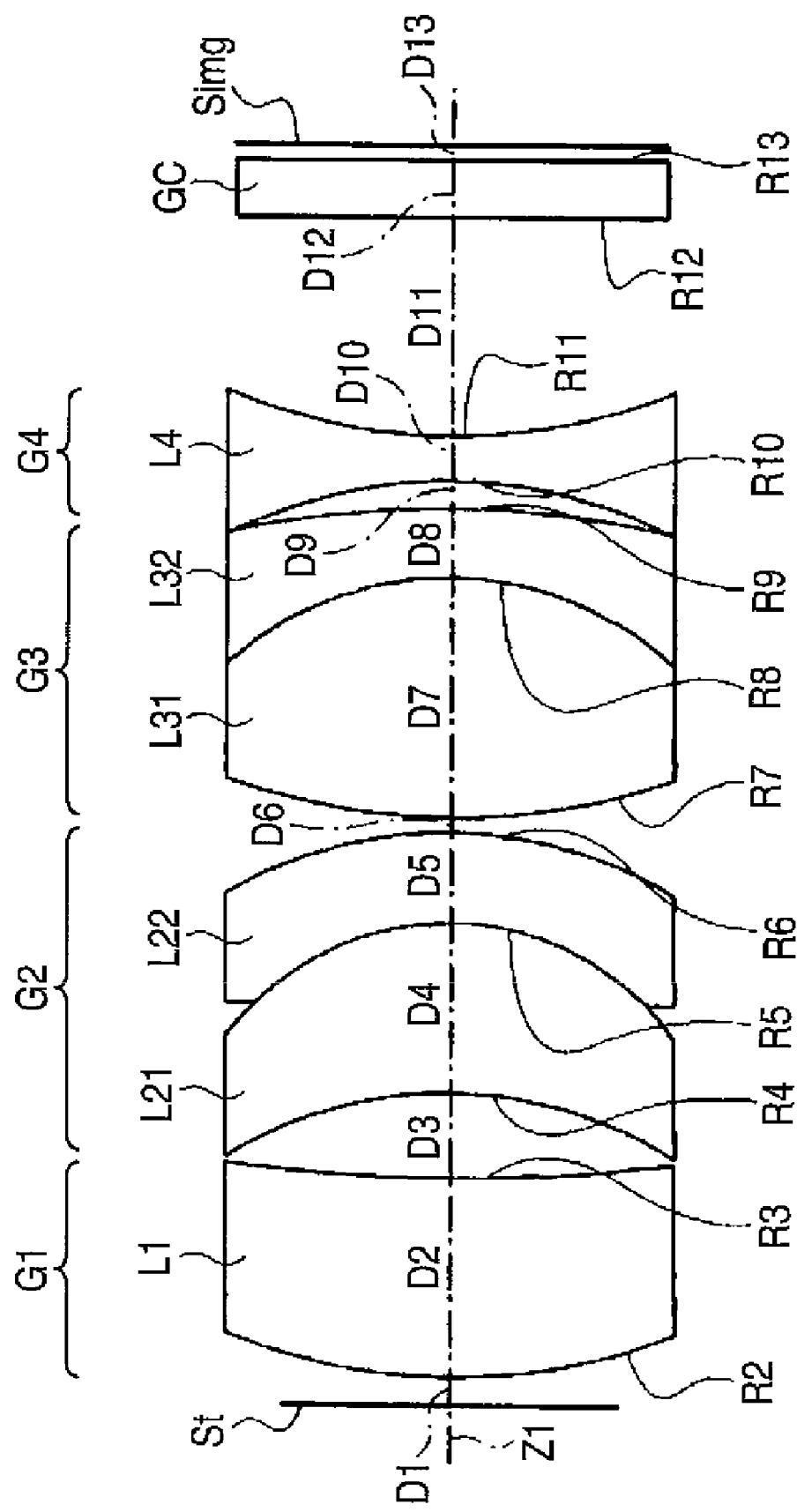
FIG. 8 is a sectional view showing an eighth structure example of the imaging lens according to an embodiment of the invention, illustrating a lens corresponding to Example 8.
Figure 9:
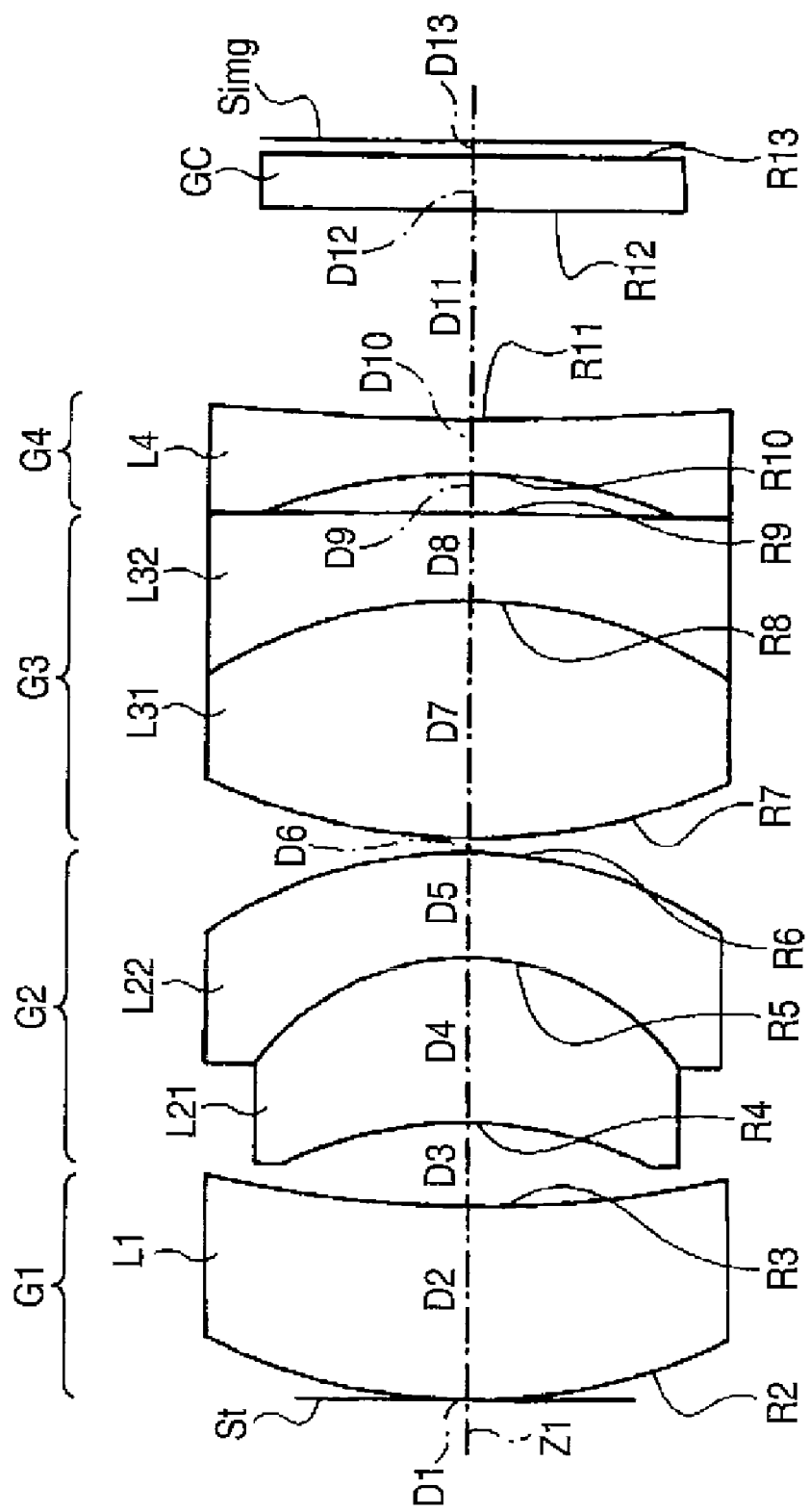
FIG. 9 is a sectional view showing a ninth structure example of the imaging lens according to an embodiment of the invention, illustrating a lens corresponding to Example 9.
Figure 10:
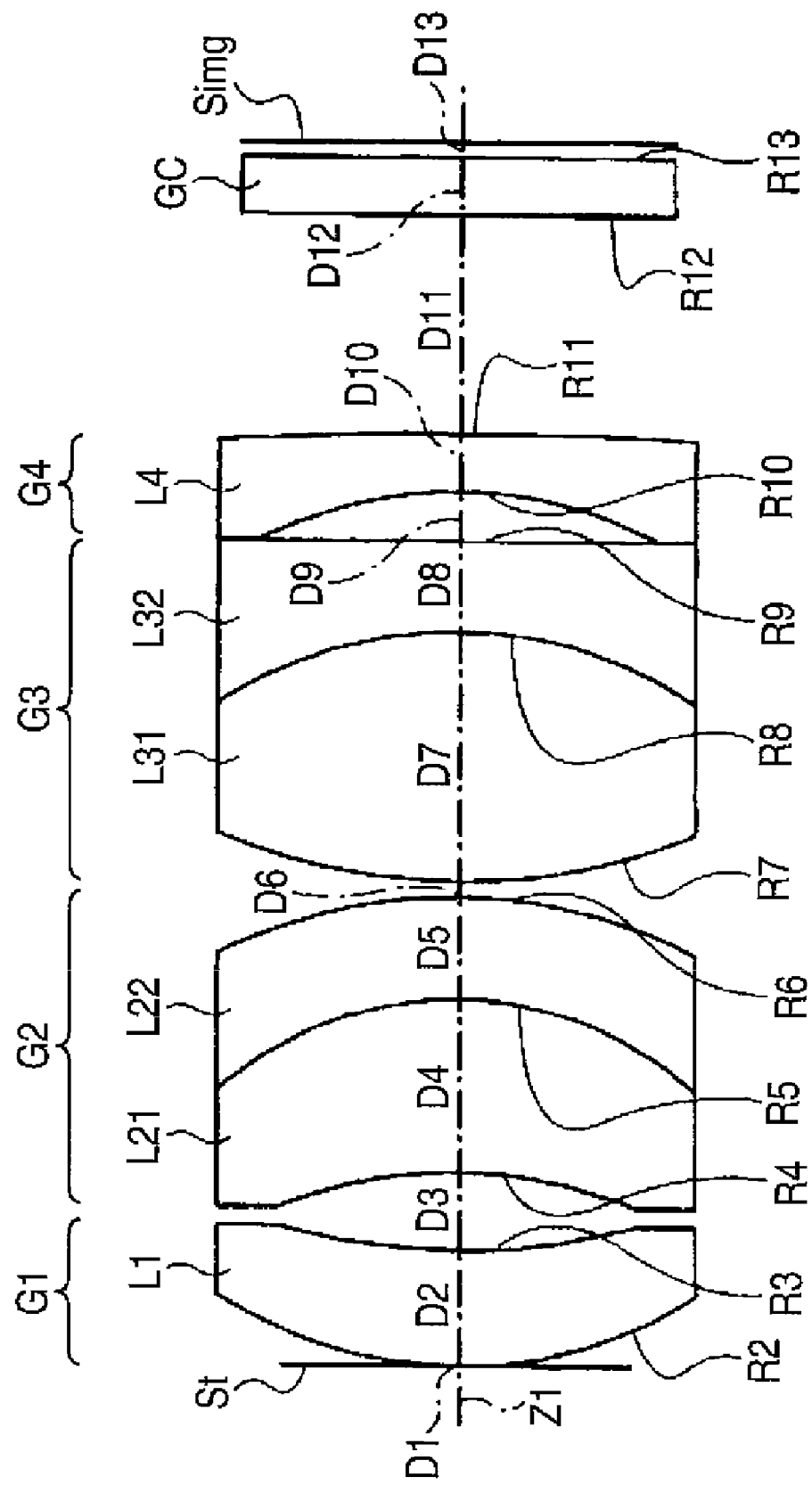
FIG. 10 is a sectional view showing a tenth structure example of the imaging lens according to an embodiment of the invention, illustrating a lens corresponding to Example 10.
Figure 11:
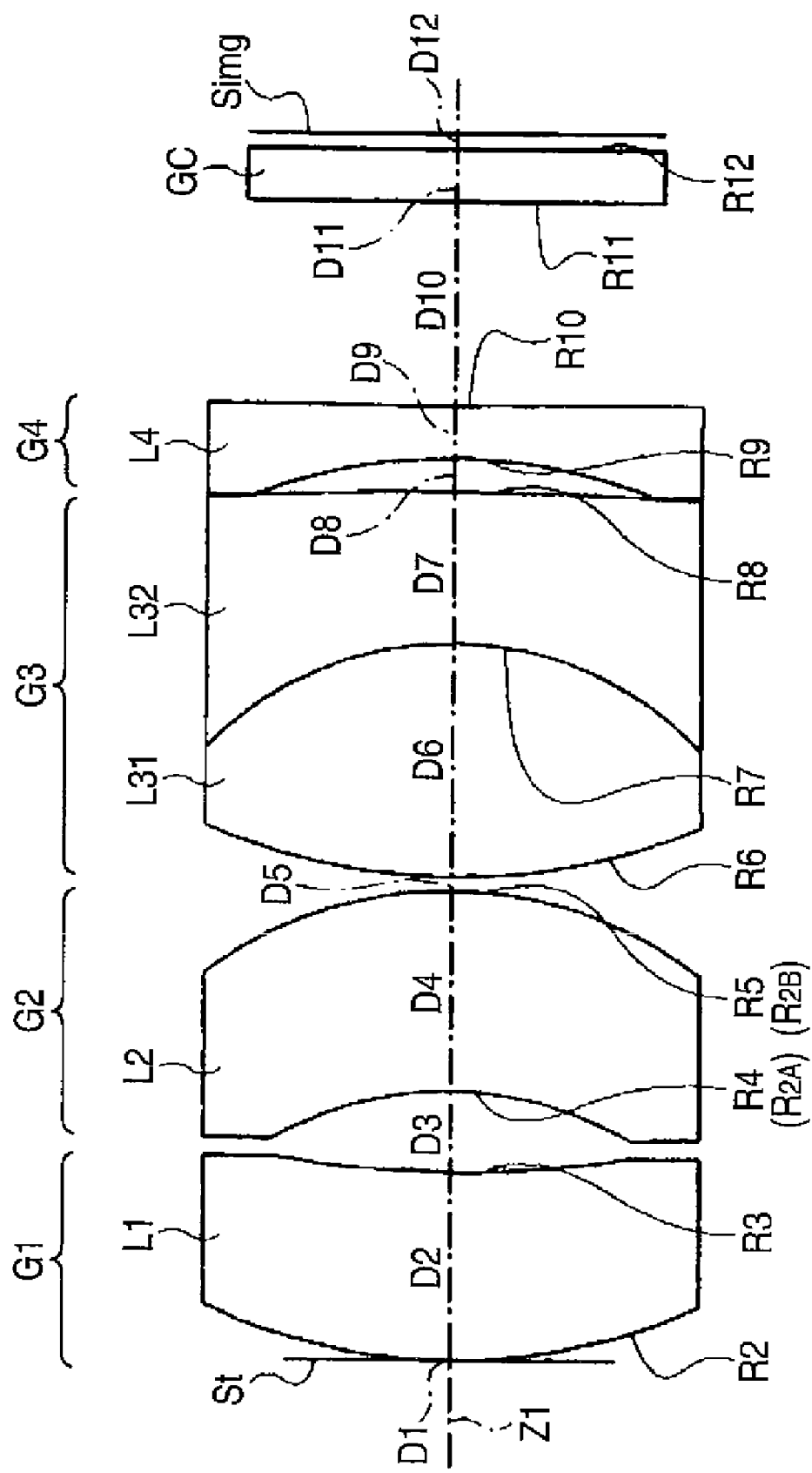
FIG. 11 is a sectional view showing an eleventh structure example of the imaging lens according to an embodiment of the invention, illustrating a lens corresponding to Example 11.
Figure 12:
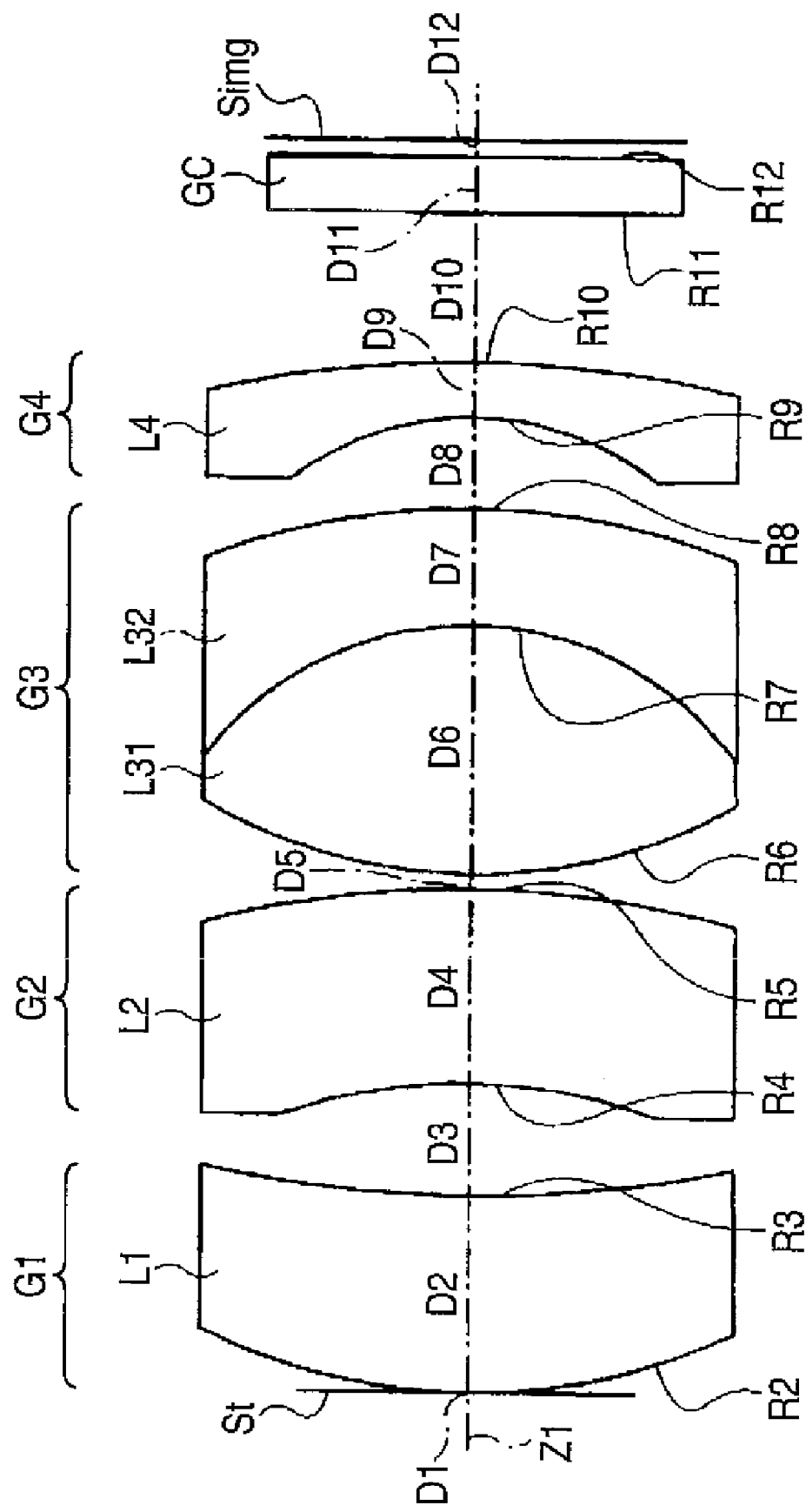
FIG. 12 is a sectional view showing a twelfth structure example of the imaging lens according to an embodiment of the invention, illustrating a lens corresponding to Example 12.
Figure 13:
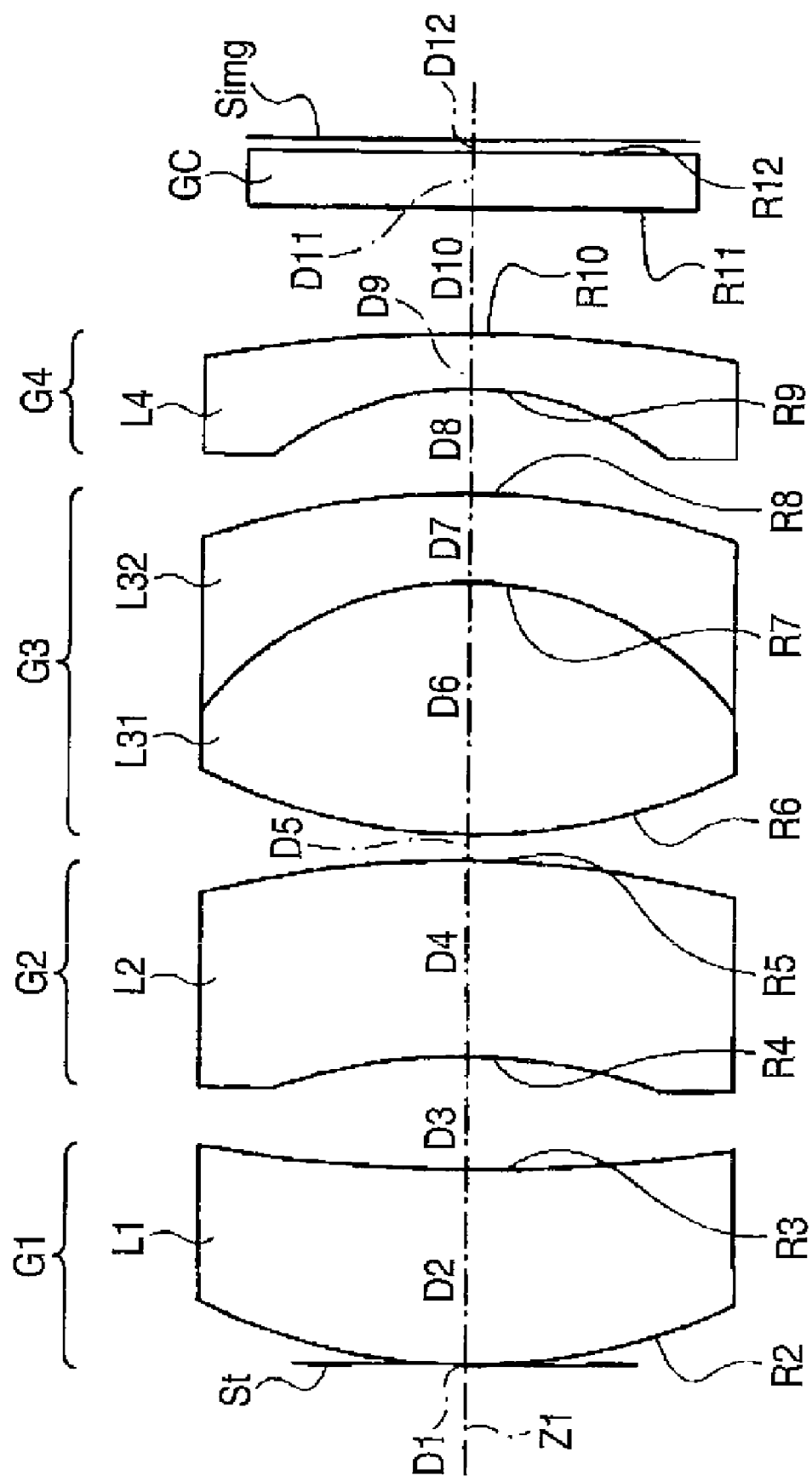
FIG. 13 is a sectional view showing a thirteenth structure example of the imaging lens according to the embodiment of the invention, illustrating a lens corresponding to Example 13.
Figure 14:
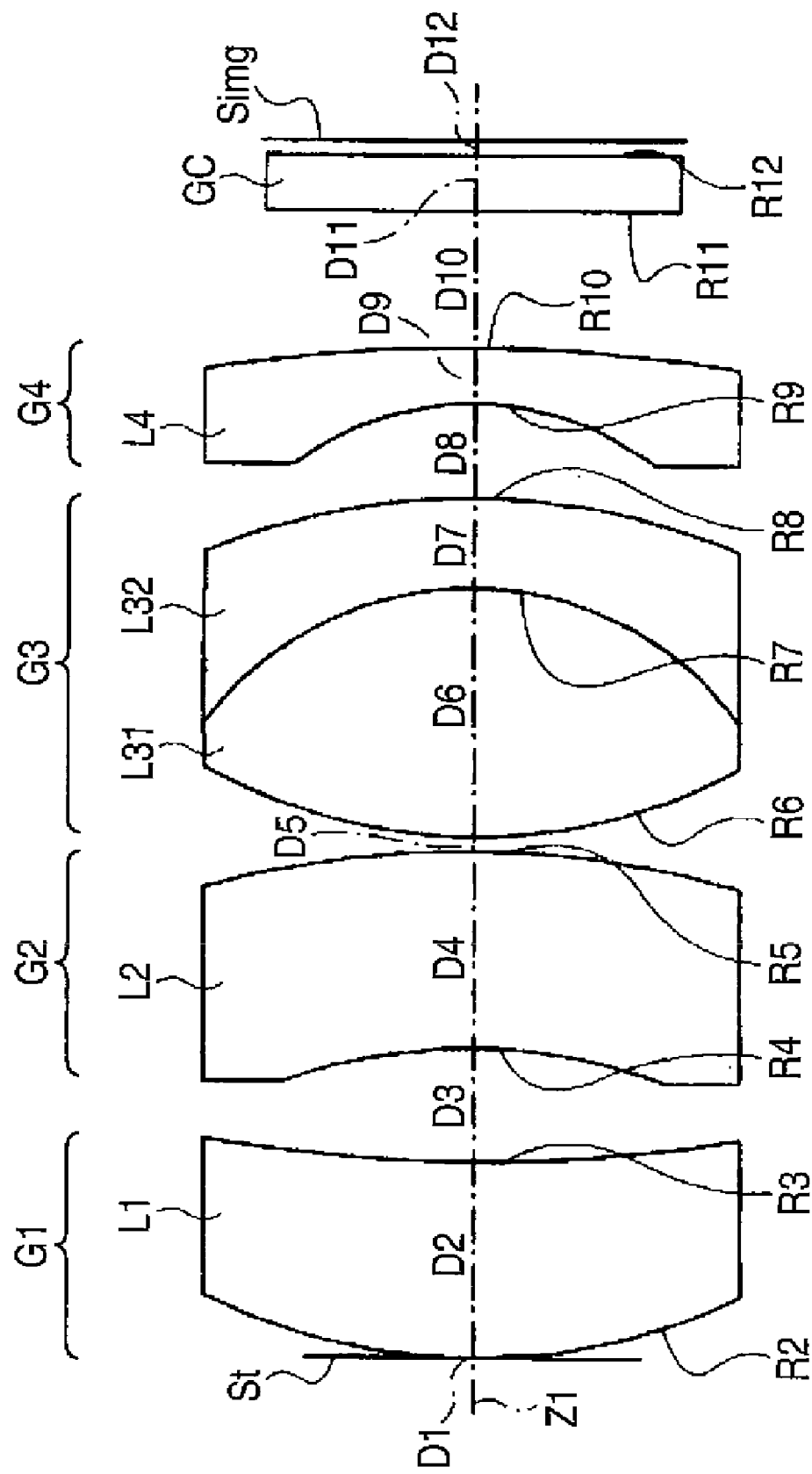
FIG. 14 is a sectional view showing a fourteenth structure example of the imaging lens according to an embodiment of the invention, illustrating a lens corresponding to Example 14.

FIG. 1 shows a first structure example of an imaging lens according an exemplary embodiment of the invention. The structure example corresponds to a lens structure according to a first numerical example which will be described below (FIG. 17). FIGS. 2 to 16 show second to sixteenth structure examples and correspond to lens structures according to second to sixteenth numerical examples which will be described below (FIGS. 18 to 32). In FIGS. 1 to 16, Ri indicates a radius of curvature of an i-th surface to which a symbol is attached to be sequentially increased toward an image side (an image formation side) with a surface of a component on the most object side set to be first. Di denotes an on-axis surface spacing on an optical axis Z1 between the i-th surface and an (i+1)th surface.

Figure 52:
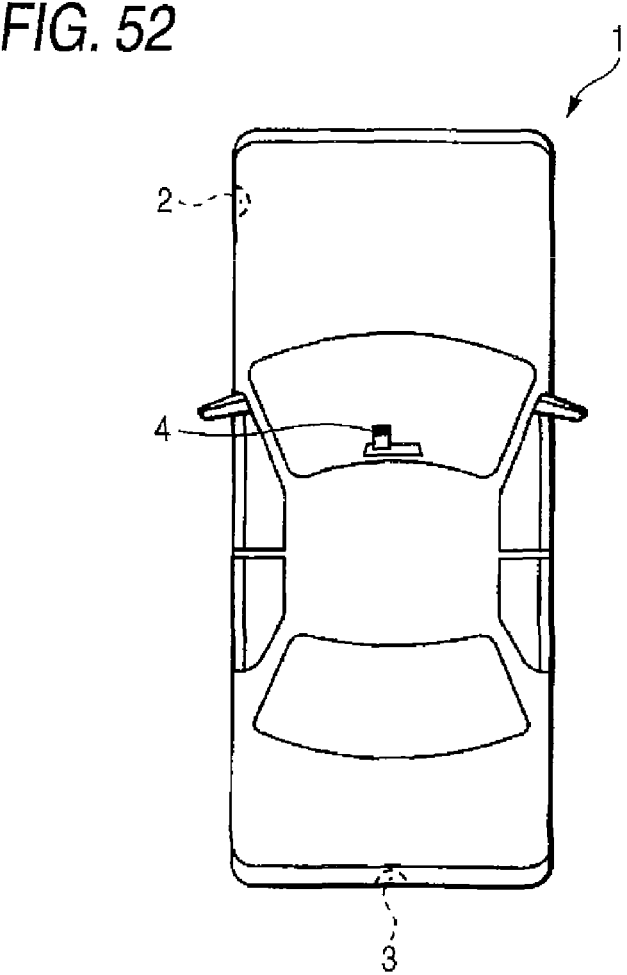
FIG. 52 is a view showing a whole configuration in an example in which an imaging apparatus according to an embodiment of the invention is loaded onto a car.

An imaging lens according to the embodiment is an imaging lens system to be used in various imaging apparatuses using an imaging device such as a CCD or a CMOS, for example, an onboard camera, a monitoring camera and a camera for a portable terminal. In particular, the imaging lens is suitable for an onboard camera for imaging a video in a front, side or rear part of a car. FIG. 52 shows a state in which an imaging lens and an imaging apparatus according to the embodiment are loaded onto a car 1 as an example of use. In FIG. 52, the car 1 includes an onboard camera 2 for imaging a dead angle range of a side surface on a passenger seat side thereof, an external camera 3 for imaging a dead angle range in a rear part of the car 1, and a room camera 4 attached to a back face of a room mirror and serving to image the same field range as a driver. The onboard camera 2, the external camera 3 and the room camera 4 function as an imaging apparatus according to the embodiment respectively, and each of them includes an imaging lens shown in FIG. 1, for example, and an imaging device 100 for converting an optical image formed by the imaging lens into an electric signal.

An imaging lens according to the embodiment has a 4-group configuration as a whole and includes a first lens group G1 having a positive power as a whole, a second lens group G2 in which a lens in the most object side has a concave surface on the object side, a third lens group G3 including a cemented lens of a lens L31 having a positive power and a lens L32 having a negative power, and a fourth lens group G4 having a negative power as a whole, in order from the object side. The imaging device 100 such as a CCD is disposed in an image formation surface Simg of the imaging lens. An imaging apparatus according to the embodiment includes at least the imaging lens and the imaging device 100. Various optical members GC may be disposed between the fourth lens group G4 and the imaging device 100 corresponding to a structure on a camera side to which the lens is attached. For example, a plate-shaped optical member such as a cover glass for protecting an imaging surface or an infrared cut filter may be disposed. The imaging device 100 is not shown in FIGS. 2 to 10.

Moreover, a low-pass filter or a filter for cutting a specific wave range may be disposed between the respective lenses other than a portion between the fourth lens group G4 and the imaging device 100. Moreover, it is also possible to apply a coat acting in the same manner as various filters onto a lens surface of any of the lenses in each of the lens groups.

Figure 50:
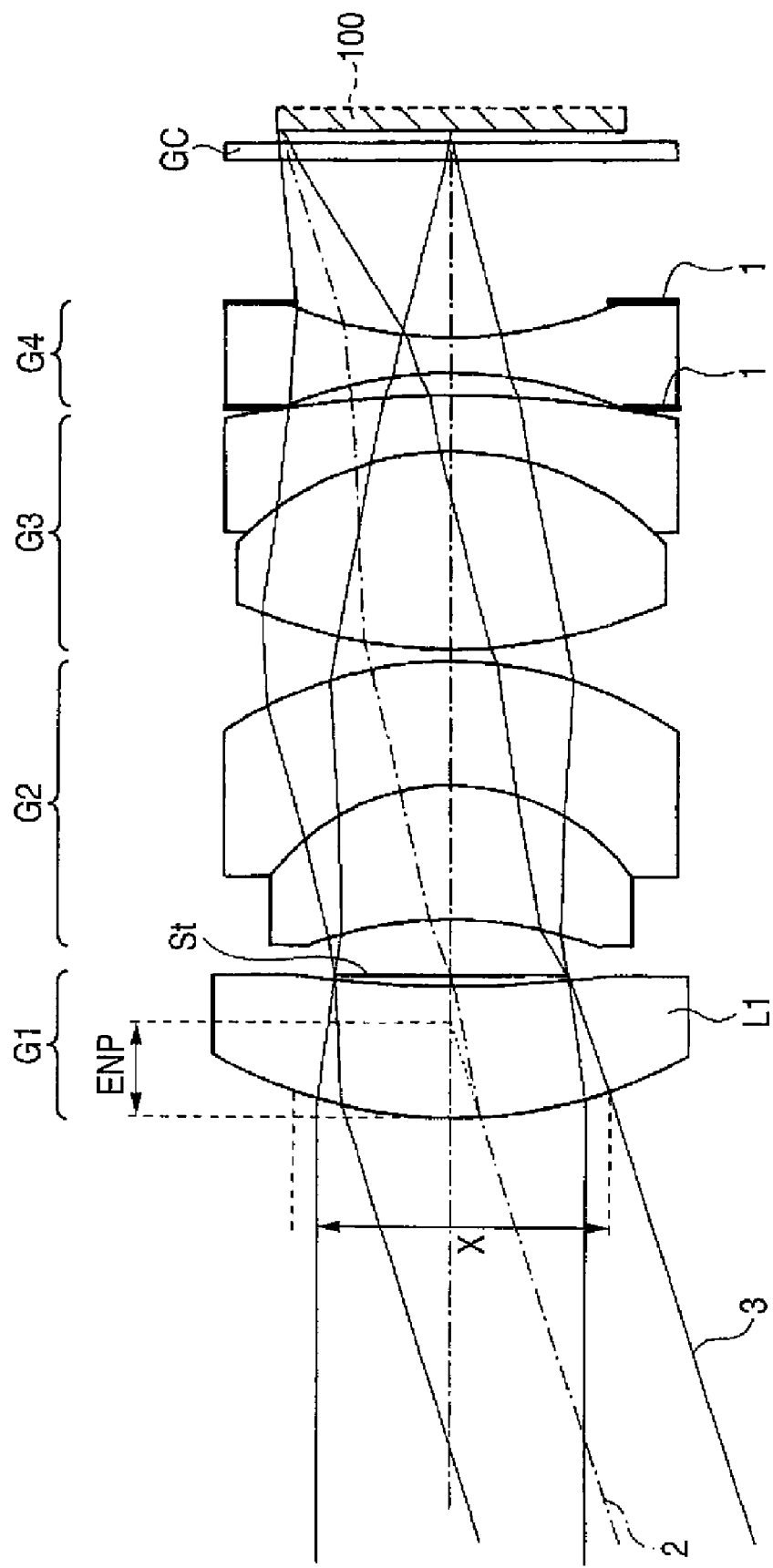
FIG. 50 is an explanatory view showing an entrance pupil position in the case in which an aperture diaphragm is provided on an image side from a lens surface on a most object side.

Moreover, a member for shielding a light flux passing through an outside of an effective diameter may be provided as shielding means between the respective lenses if necessary. When the light flux passes through the outside of the effective diameter of the lens, there is a possibility that the light flux may be changed into a stray light to reach an image surface, resulting in a ghost. The shielding means may be an opaque plate member or an opaque coating material applied to the outside of the effective diameter of each of the lenses. The shielding means may be disposed between all of the lenses, if necessary. For example, as shown in FIG. 50, shielding means 1 may be provided on a lens at the most image side. In FIG. 50, a beam 2 indicates a principal ray in a light flux which is incident at a maximum field angle and a beam 3 indicates a marginal ray in the light flux which is incident at the maximum field angle.

The first lens group G1 is constituted by a lens having a convex surface on the object side and having a positive power. The first lens group G1 may be constituted by a plurality of lenses.

The second lens group G2 is constituted by at least one lens. In the case in which the second lens group G2 is constituted by a lens, the lens may be a meniscus shape having a concave surface on the object side. In the case in which the second lens group G2 is constituted by a plurality of lenses, the second lens group G2 may be constituted by a cemented lens including a lens having a concave surface on the object side and a lens having a convex surface on the image side in order from the object side, for example.

In the case in which the second lens group G2 has a lens having a negative power, an Abbe number of the lens having the negative power at the d-line may be equal to or smaller than 40. By setting the Abbe number of the lens having the negative power at the d-line which is equal to or smaller than 40, it is possible to correct a chromatic aberration on an axis and a lateral chromatic aberration well.

The cemented lens in the third lens group G3 is constituted by the lens L31 having a positive power and the lens L32 having a negative power in order from the object side. The lens L31 having the positive power may be disposed on the image side and the lens L32 having the negative power may be disposed on the object side.

An Abbe number of the lens L32 having the negative power in the cemented tens of the third lens group G3 may be equal to or smaller than 40. By setting the Abbe number of the lens L32 having the negative power in the cemented lens of the lens group G3 to be equal to or smaller than 40, it is possible to correct a chromatic aberration on an axis and a lateral chromatic aberration well.

The fourth lens group G4 is a single lens having a concave surface on the object side and having a negative power. The fourth lens group G4 may be constituted by a plurality of lenses.

An aperture diaphragm St as an example of a stop is disposed on the object side from the second lens group G2. By setting the first lens group G1 to be a lens having a convex surface on the object side and having a positive power and disposing the aperture diaphragm St on the object side from the second lens group G2, it is possible to bring an entrance pupil position forward while correcting the aberration well and to reduce an area of exposure of the lens. In the case in which the aperture diaphragm St is disposed between the first lens group G1 and the second lens group G2, particularly, it is possible to bring the entrance pupil position forward while correcting a comatic aberration well. Therefore, it is possible to obtain a structure which is advantageous to a performance. In the case in which the aperture diaphragm St is disposed on the object side from the first lens group G1, moreover, the entrance pupil position can be brought forward from the lens system and the area of exposure of the lens can be minimized. Therefore, it is possible to obtain a structure which is advantageous to a reduction in a size. In the case in which the first lens group G1 is constituted by a plurality of lenses, the aperture diaphragm St may be disposed in the first lens group G1.

FIGS. 1 to 10 show examples in which the imaging lens has the 4-group 6-lens configuration as a whole. In particular, FIGS. 1 to 6 show examples of the configuration of the imaging lens in which the aperture diaphragm St is disposed between the first lens group G1 and the second lens group G2 in the 4-group 6-lens configuration. Moreover, FIGS. 7 to 10 show examples of a configuration of the imaging lens in which the aperture diaphragm St is disposed on a front side of the first lens group G1 in the 4-group 6-lens configuration as a whole. In the examples of the configuration in FIGS. 1, 3, 4 and 7, the optical member GC such as a cover glass is not used as the imaging device 100.

In the case in which the imaging lens according to the embodiment has the 4-group 6-lens configuration, the first lens group G1 may be constituted by a lens L1 having a convex surface on the object side and having a positive power, the second lens group G2 may be constituted by a cemented lens of a lens L21 having a concave surface on the object side and a lens L22 having a convex surface on the image side in order from the object side, and the fourth lens group G4 may be constituted by a lens L4 having a concave surface on the object side and having a negative power. In the lens system having the 4-group 6-lens configuration, consequently, each of the lens structures can be optimized more greatly, an optical performance can be held much better, and at the same time, a size and a weight can be reduced more advantageously.

Figure 15:
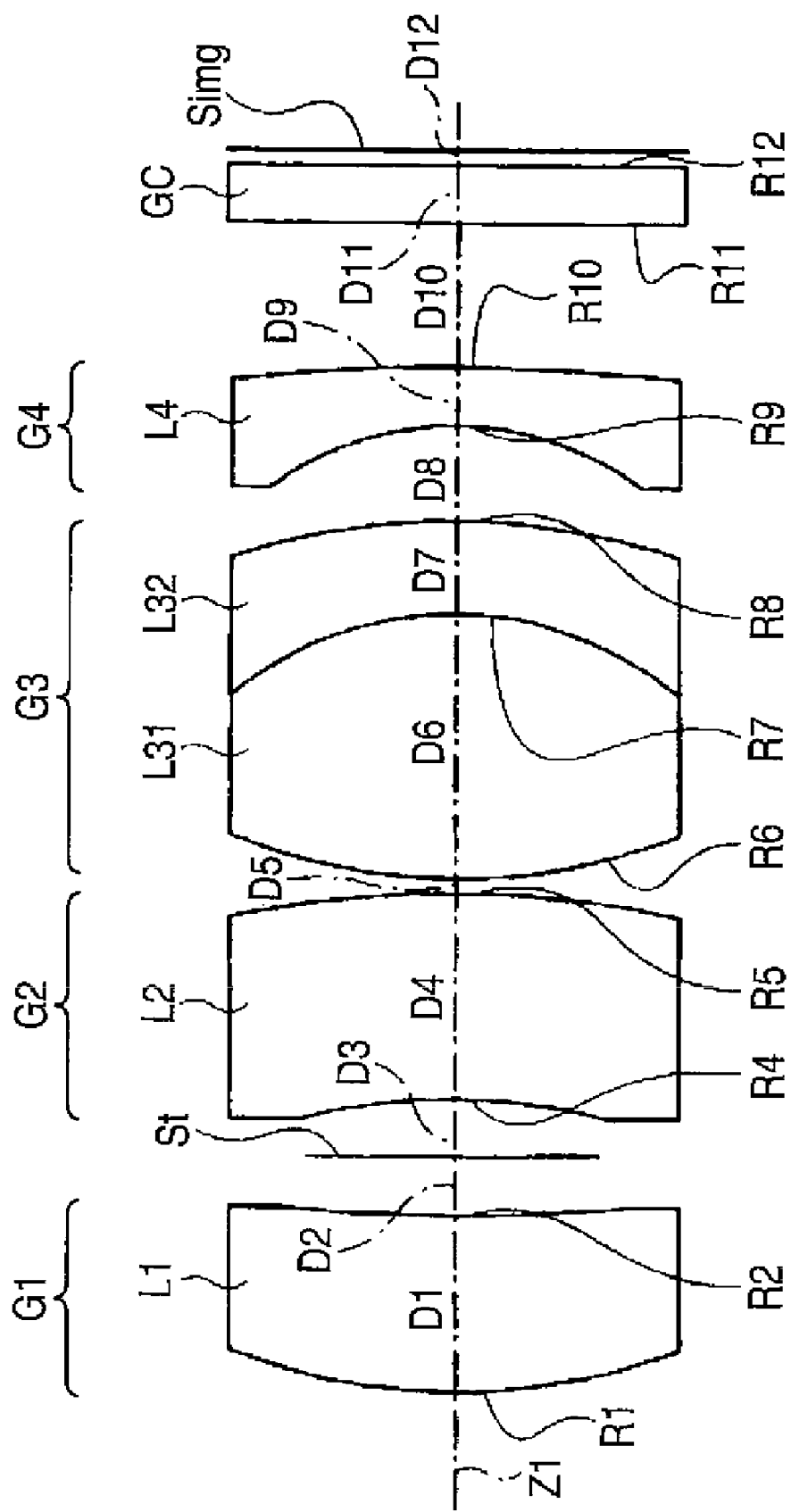
FIG. 15 is a sectional view showing a fifteenth structure example of the imaging lens according to an embodiment of the invention, illustrating a lens corresponding to Example 15.
Figure 16:
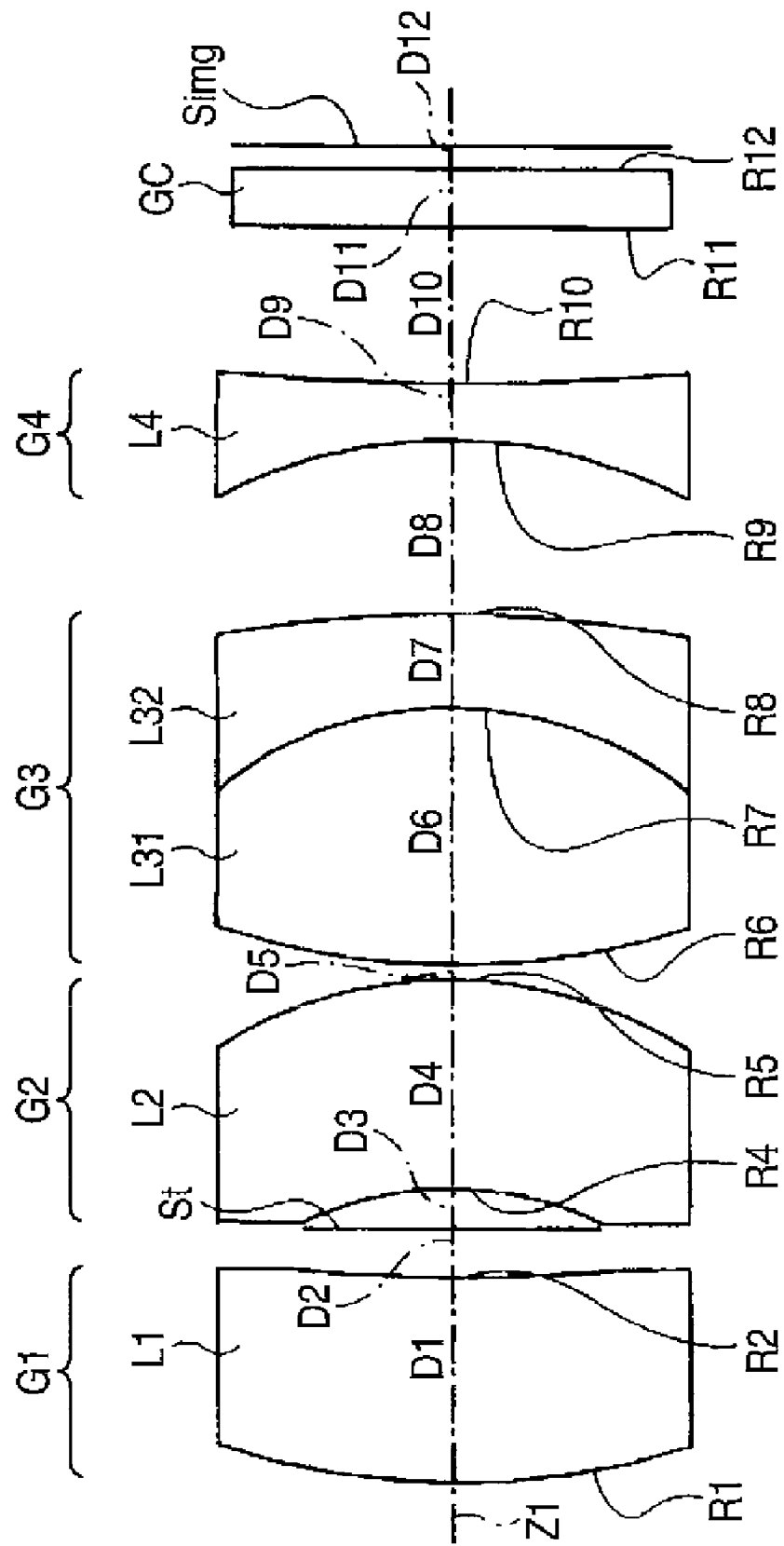
FIG. 16 is a sectional view showing a sixteenth structure example of the imaging lens according to an embodiment of the invention, illustrating a lens corresponding to Example 16.
Figure 34:
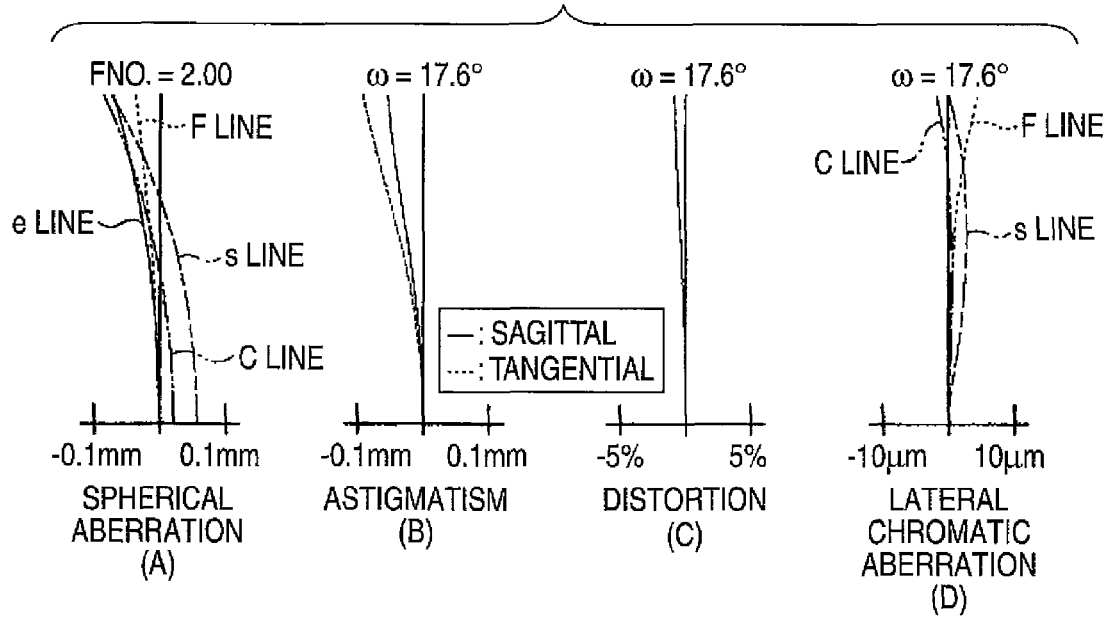
FIG. 34 is an aberration chart showing various aberrations in the imaging lens according to Example 1, (A) showing a spherical aberration, (B) showing an astigmatism, (C) showing a distortion, and (D) showing a lateral chromatic aberration.

Moreover, FIGS. 11 to 16 show examples in which the imaging lens has a 4-group 5-lens configuration. In particular, FIGS. 11 to 14 show examples of the configuration of the imaging lens in which the aperture diaphragm St is disposed on a front side of the first lens group G1 in the 4-group 5-lens configuration. FIGS. 15 and 16 show examples of a configuration of the imaging lens in which the aperture diaphragm St is disposed between the first lens group G1 and the second lens group G2 in the 4-group 5-lens configuration.

In the case in which an imaging lens according to the embodiment has the 4-group 5-lens configuration, the first lens group G1 may be constituted by a lens L1 having a convex surface on the object side and having a positive power, the second lens group G2 may be constituted by a meniscus lens L2 having a concave surface on the object side, and the fourth lens group G4 may be constituted by a lens L4 having a concave surface on the object side and having a negative power. In the lens system having the 4-group 5-lens configuration, consequently, each of the lens structures can be optimized more greatly, a more excellent optical performance can be held, and at the same time, a size and a weight can be reduced more advantageously.

In an imaging lens according to the embodiment, the lens in the most image side of the second lens group G2 (the lens L22 in the example of the 4-group 6-lens configuration and the lens L2 in the example of the 4-group 5-lens configuration) may have a convex surface on the image side.

Moreover, an imaging lens according to the embodiment may satisfy the following conditions. Consequently, the configuration of the second lens group G2 can be optimized and various aberrations can be corrected advantageously:

$$2.0 < |f2/f| \tag{1}$$

$$0.3 < |R_{2A}/R_{2B}| < 2 \tag{2}$$

wherein f represents a focal length of the whole system, f2 represents a focal length of the second lens group G2, $R_{2A}$ represents a radius of curvature of a surface on the most object side of the second lens group G2, and $R_{2B}$ represents a radius of curvature of a surface on the most image side of the second lens group G2.

Figure 51:
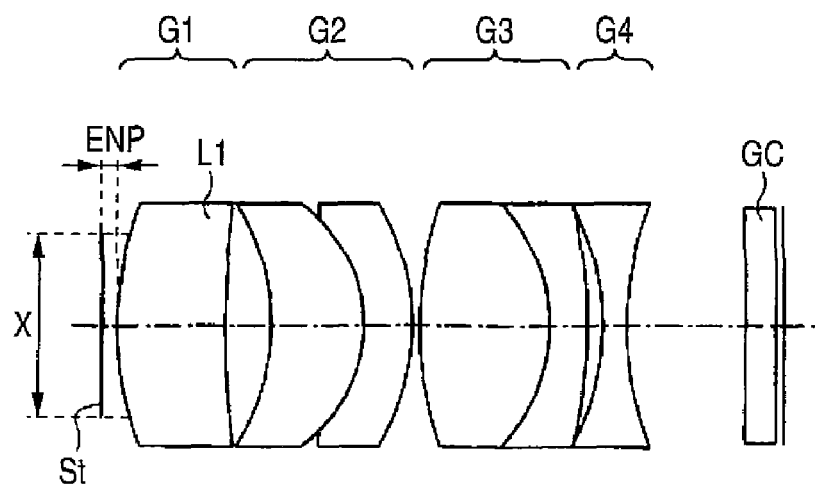
FIG. 51 is an explanatory view showing the entrance pupil position in the case in which the aperture diaphragm is provided on the most object side.

Moreover, the following condition may be satisfied. Consequently, it is possible to reduce a diameter of an exposed portion to an outside of the lens L1 on the most object side:

$$|ENP|/L < 0.5 \tag{3}$$

wherein ENP represents a distance from a surface apex on the most object side of the first lens group G1 to an entrance pupil of the entire lens system, and L represents a distance from the surface on the most object side of the first lens group G1 to an imaging surface. ENP indicates a distance shown in FIG. 51 when the aperture diaphragm St is provided on the further object side from the lens L1 on the most object side. When the aperture diaphragm St is provided on the image side from the lens L1 on the most object side, moreover, a distance shown in FIG. 50 is obtained.

When the lens L31 having a positive power in the cemented lens is a biconvex lens and a refractive index and an Abbe number of the biconvex lens at the d-line are represented by Np and vp, respectively, and a refractive index and an Abbe number of the lens L32 having a negative power in the cemented lens at the d-line are represented by Nn and vn, respectively, in the third lens group G3, the following conditions may be satisfied. Consequently, the chromatic aberration can be corrected advantageously.

$$Nn - Np < 0.40 \tag{4}$$

$$vp/vn > 1.0 \tag{5}$$

Moreover, the following condition may be satisfied. Consequently, a focal length of the fourth lens group G4 can be optimized and various aberrations can be corrected advantageously:

$$-6.0 < f4/f < -0.2 \tag{6}$$

wherein f represents a focal length of the whole system and f4 represents a focal length of the fourth lens group G4.

Furthermore, the following conditions may be satisfied:

$$1.0 < f1/f < 6.5 \tag{7}$$

$$0.4 < f3/f < 2.0 \tag{8}$$

wherein f represents a focal length of the whole system, f1 represents a focal length of the first lens group G1, and f3 represents a focal length of the third lens group G3.

In the case in which an imaging lens according to the embodiment is used in a harsh environment such as an onboard camera, for example, a material having excellent water, acid and chemical resistances may be used as a material of the lens L1 on the most object side. Moreover, a hard material may be used for the material of the lens L1 on the most object side.

In case of use in a wide temperature range such as an onboard camera, for example, a material having a small coefficient of linear expansion may be used. For this reason, all of the lenses in the first to fourth lens groups G1 to G4 may be constituted by glass so as to be usable within the wide temperature range. In this case, all of surfaces may be constituted by spherical surfaces in order to fabricate an inexpensive imaging lens.

Although all of the lenses are constituted by glass spherical lenses in examples which will be described below, an aspheric surface may be used to correct each of the aberrations more greatly. In this case, plastic may be used as a material of the lens in order to fabricate the aspheric surface with higher precision. Moreover, it is also possible to use transparent ceramics as the material of the lens.

In the case in which the second lens group G2 is set to be the cemented lens including the lens L21 having a concave surface on the object side and the lens L22 having a convex surface on the image side, it is also possible to use the same material for the lens L21 having the concave surface on the object side and the lens L21 having the convex surface on the image side.

Next, more detailed description will be given to the functions and effects of the imaging lens having the structure described above, particularly, functions and effects related to the conditional expressions.

In an imaging lens according to the embodiment, the configuration of each of the lens groups is set to be proper in the lens system having the 4-group structure as a whole. Consequently, it is possible to easily obtain an advantageous performance to a reduction in a size and a weight while holding an excellent optical performance. In particular, the surface on the object side in the lens on the most object side in the second lens group G2 is set to be concave on the object side so that a field curvature can be corrected well. At the same time, the off-axis beam is refracted along the optical axis so that a size in a radial direction of the lens system is reduced. Moreover, the third lens group G3 is set to be the cemented lens including the lens L31 having a positive power and the lens L32 having a negative power so that a chromatic aberration can be corrected well in a wide waveband from the visible range to the near infrared region. By employing a structure in which the surface on the image side of the lens on the most image side in the second lens group G2 has a convex surface on the image side, moreover, it is possible to correct the field curvature more greatly.

In the imaging lens according to the embodiment, by constituting the first lens group G1 by the lens L1 having a convex surface on the object side and having a positive power, it is possible to correct the comatic aberration well. By setting the fourth lens group G4 to be the lens L4 having a concave surface on the object side and having a negative power, moreover, it is possible to prolong a back focus and to correct the field curvature well.

In the case in which an imaging lens according to the embodiment is set to wholly have the 4-group 6-lens configuration as in the examples of the structures shown in FIGS. 1 to 10 and the second lens group G2 is constituted by the cemented lens including the lens L21 having the concave surface on the object side and the lens L22 having the convex surface on the image side in order from the object side, particularly, it is possible to correct the longitudinal chromatic aberration and the lateral chromatic aberration well within the wide wavelength range from the visible range to the near infrared region in the second lens group G2.

In the case in which an imaging lens according to the embodiment is set to wholly have the 4-group 5-lens configuration as in the examples of the structure shown in FIGS. 11 to 16 and the second lens group G2 is constituted by the meniscus lens L2 having a concave surface on the object side, particularly, it is possible to correct the field curvature well in the second lens group G2.

The conditional expressions (1) and (2) relate to the configuration of the second lens group G2. It is preferable that the conditional expressions (1) and (2) are satisfied and the power of the second lens group G2 are comparatively low. In particular, the conditional expression (1) defines a proper focal distance of the second lens group G2. When a lower limit of the conditional expression (1) falls below, the spherical aberration is increased and an excellent image is hard to obtain, which is not preferable. When an upper or lower limit of the conditional expression (2) is exceeded, moreover, the field curvature is hard to correct well, which is not preferable.

The conditional expression (3) defines a proper relationship between the distance ENP from a surface apex on the most object side of the first lens group G1 to the entrance pupil and the distance L from the surface on the most object side of the first lens group G1 to the imaging surface. By satisfying the conditional expression (3), it is possible to reduce a size of the lens portion exposed to the outside of the lens L1 on the most object side. When the range of the conditional expression (3) is exceeded, the exposed portion to the outside of the lens L1 on the most object side is enlarged and an appearance of a car might be deteriorated in case of use as the onboard camera, for example, which is not preferable.

The conditional expressions (4) and (5) define a proper lens material of the cemented lens of the third lens group G3. When the lower limit of the conditional expression (4) falls below, a radius of curvature of a cemented surface of the cemented lens of the third lens group G3 is reduced so that it is hard to carry out a processing. When the range of the conditional expression (5) is exceeded, it is hard to correct the longitudinal chromatic aberration and the lateral chromatic aberration well. The conditional expressions (4) and (5) may be satisfied and the lens L31 having the positive power in the cemented lens of the third lens group G3 should be a biconvex lens. By setting the lens L31 having the positive power in the cemented lens of the third lens group G3 to be the biconvex lens, it is possible to increase the positive lens power. Thus, the chromatic aberration can be corrected advantageously.

The conditional expression (6) defines a proper focal length of the fourth lens group G4. When the upper limit of the conditional expression (6) is exceeded, the power of the lens L4 having the negative power in the fourth lens group G4 is reduced, resulting in a meniscus lens having a close absolute value of a radius of curvature of front and rear surfaces in order to correct the field curvature. Therefore, it is hard to carry out a processing. When the lower limit of the conditional expression (6) falls below, the field curvature is increased together with the comatic aberration so that it is hard to obtain an excellent image.

The conditional expression (7) defines a proper focal length of the first lens group G1. When the upper limit of the conditional expression (7) is exceeded, it is hard to correct the comatic aberration well. When the lower limit of the conditional expression (7) falls below, a back focus is shortened and the field curvature is also corrected with difficulty.

The conditional expression (8) defines a proper focal length of the third lens group G3. When the range of the conditional expression (8) is exceeded, it is hard to correct the chromatic aberration.

An imaging lens, moreover, may satisfy the following conditional expression (9). The conditional expression (9) relates to a size of the exposed portion to the outside of the lens L1 on the most object side. For example, in the case in which an imaging lens is used for the onboard camera, an exposed lens diameter may be small in order to prevent a deterioration in the appearance of the car. More specifically, when an aperture diaphragm system is represented by X in the case in which the aperture diaphragm St is provided on the object side from the lens L1 on the most object side (see FIG. 51) and an effective diameter of the lens L1 on the most object side is represented by X in the case in which the aperture diaphragm is disposed between the lens L1 on the most object side and a second lens from the object side (see FIG. 50), X/L may be equal to or smaller than 0.5 as indicated in the conditional expression (9).

$$X/L \leq 0.50 \quad (9)$$

As described above, according to an imaging lens of the embodiment, the configuration of each of the lens groups is optimized in the lens system having the 4-group configuration as a whole. Therefore, it is possible to implement the lens system having a suitable reduction in a size and a weight for the onboard camera while holding an excellent optical performance. According to an imaging apparatus of the embodiment, moreover, there is output an imaging signal corresponding to an optical image formed by a high performance imaging lens according to the embodiment. Therefore, it is possible to obtain an imaging signal having a high resolution.

Next, description will be given to a specific numerical example of am imaging lens according to the embodiment. First to sixteenth numerical examples will be collectively described below.

FIG. 17 shows, as Example 1, specific lens data corresponding to the configuration of the imaging lens illustrated in FIG. 1. A column of a surface number Si in the lens data shown in FIG. 17 indicates a number of an i-th surface which is sequentially increased toward the image side with a surface of a component on the most object side set to have a first number. A column of a radius of curvature Ri indicates a value (mm) of a radius of curvature in the i-th surface from the object side corresponding to the symbol Ri attached in FIG. 1. Similarly, a column of an on-axis surface spacing Di also indicates an interval (mm) on an axis between the i-th surface Si and an (i +1)th surface (Si+1) from the object side. Ndj indicates a value of a refractive index of a j-th optical element from the object side at the d-line (a wavelength of 587.6 nm). A column of vdj indicates a value of an Abbe number of the j-th optical element from the object side at the d-line.

In the same manner as the imaging lens according to the first example, FIGS. 18 to 32 show, as Examples 2 to 16, specific lens data corresponding to the configurations of the imaging lenses illustrated in FIGS. 2 to 16. Moreover, FIG. 33 collectively shows the number of lenses and an aperture diaphragm position, and values related to the respective conditional expressions for each of the examples. As is apparent from FIG. 33, the values in the respective Examples range in the numeric values of the conditional expressions.

The imaging lens according to each of Examples 1 to 6 has the 4-group 6-lens configuration in which the aperture diaphragm St is disposed between the first lens group G1 and the second lens group G2. The imaging lens according to each of Example 7 to 10 has the 4-group 6-lens configuration in which the aperture diaphragm St is disposed on the front side of the first lens group G1. The imaging lens according to each of Examples 11 to 14 has the 4-group 5-lens configuration in which the aperture diaphragm St is disposed on the front side of the first lens group G1. The imaging lens according to each of Examples 15 and 16 has the 4-group 5-lens configuration in which the aperture diaphragm St is disposed between the first lens group G1 and the second lens group G2. Moreover, the imaging lens according to each of Examples 1, 3, 4 and 7 is optimized in the case in which the optical member GC such as a cover glass is not used as the imaging device 100.

FIGS. 34(A) to 34(D) show a spherical aberration, an astigmatism, a distortion (a distortion aberration) and a lateral chromatic aberration in the imaging lens according to Example 1, respectively. Each aberration chart shows an aberration at the e-line (546.07 nm) set to be a reference wavelength. The spherical aberration chart and the lateral chromatic aberration chart also show aberrations at the F-line (a wavelength of 486.13 nm), the C-line (a wavelength of 656.27 nm), and the s-line (a wavelength of 852.11 nm). In the astigmatism chart, a solid line indicates an aberration in a sagittal direction and a broken line indicates an aberration in a tangential direction. FNo. indicates an F value and ω indicates a half angle of field of view.

Figure 35:
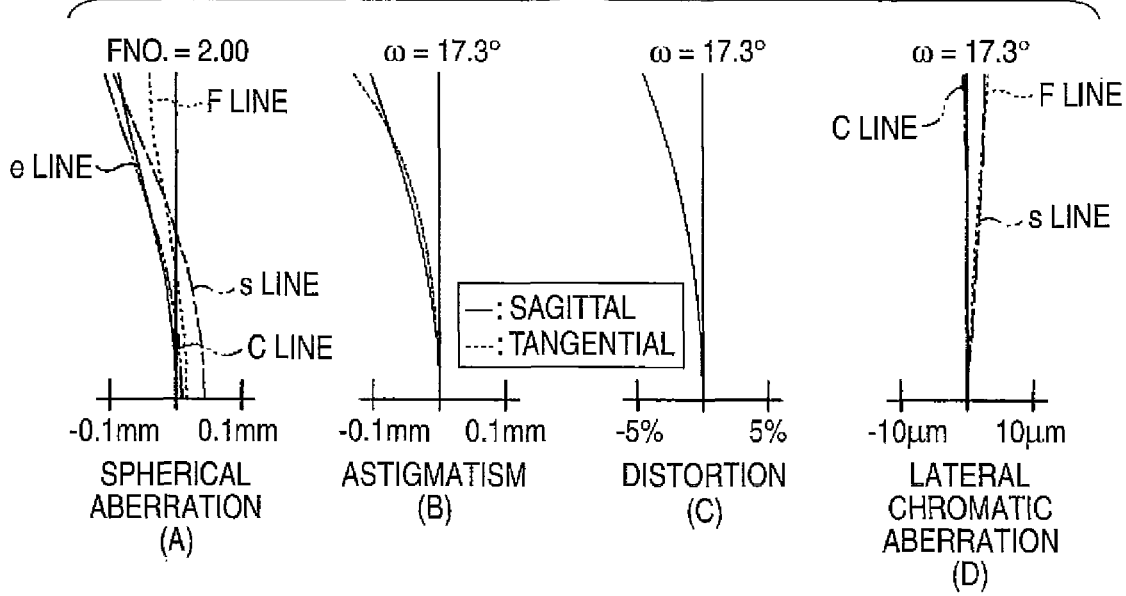
FIG. 35 is an aberration chart showing various aberrations in the imaging lens according to Example 2, (A) showing a spherical aberration, (B) showing an astigmatism, (C) showing a distortion, and (D) showing a lateral chromatic aberration.
Figure 36:
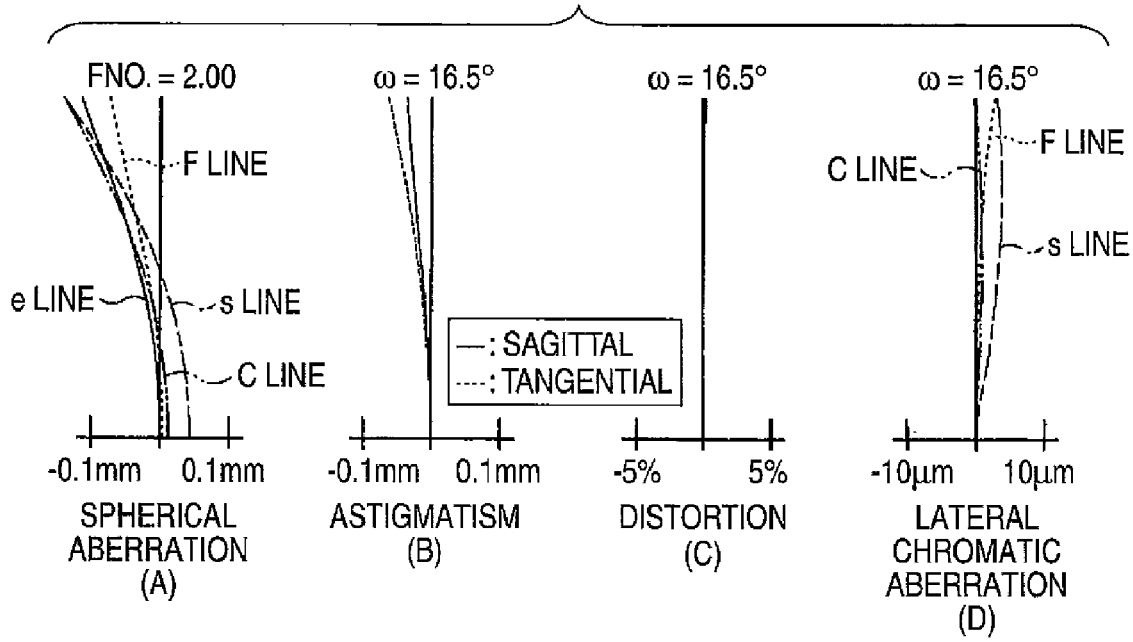
FIG. 36 is an aberration chart showing various aberrations in the imaging lens according to Example 3, (A) showing a spherical aberration, (B) showing an astigmatism, (C) showing a distortion, and (D) showing a lateral chromatic aberration.
Figure 37:
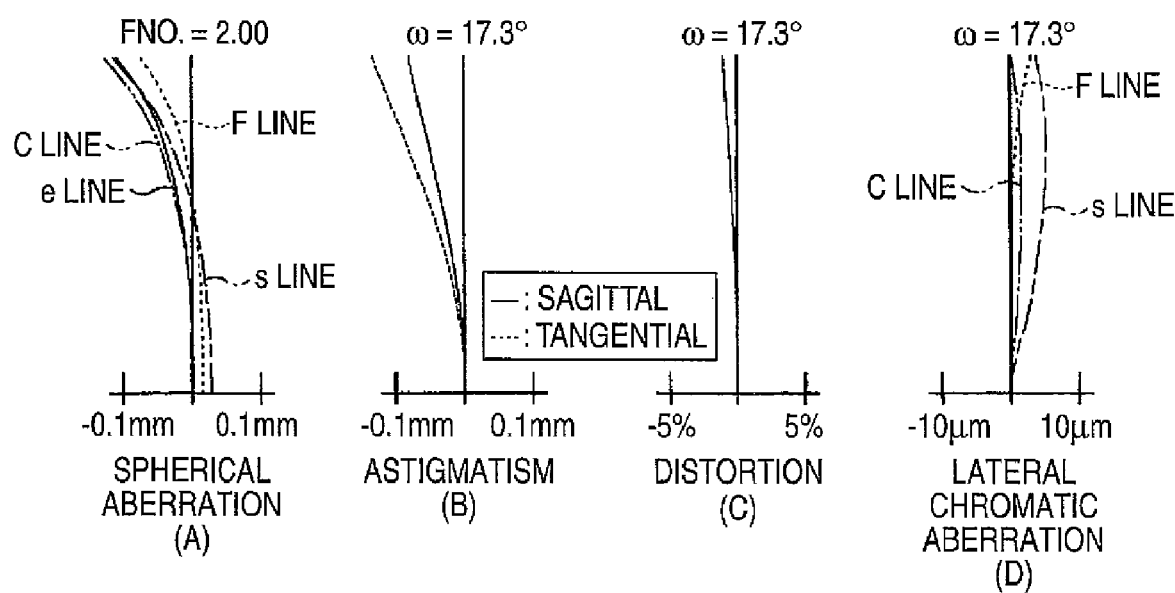
FIG. 37 is an aberration chart showing various aberrations in the imaging lens according to Example 4, (A) showing a spherical aberration, (B) showing an astigmatism, (C) showing a distortion, and (D) showing a lateral chromatic aberration.
Figure 38:
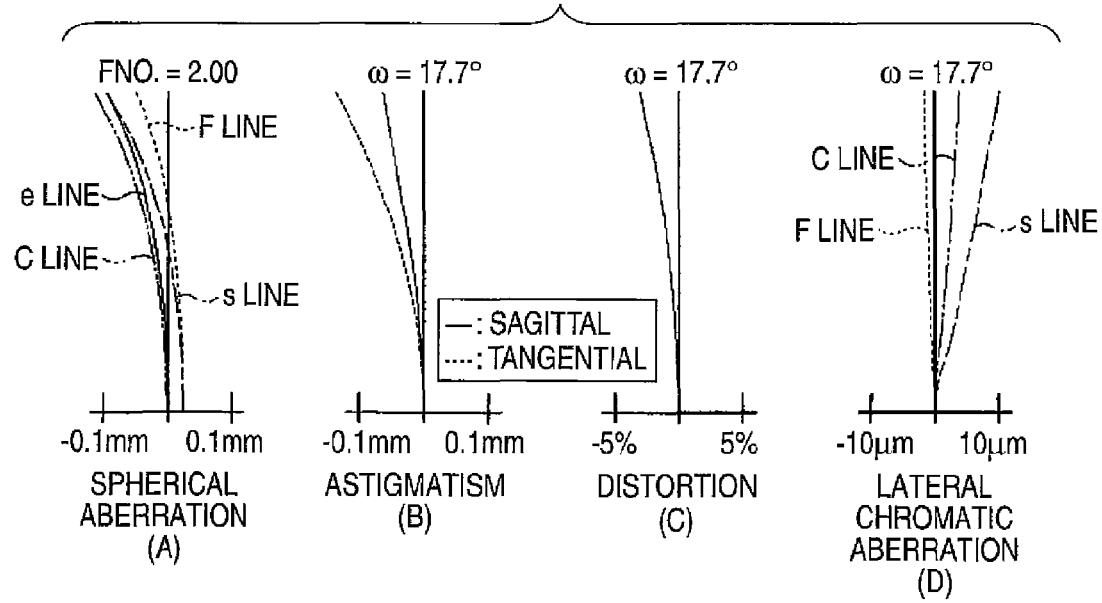
FIG. 38 is an aberration chart showing various aberrations in the imaging lens according to Example 5, (A) showing a spherical aberration, (B) showing an astigmatism, (C) showing a distortion, and (D) showing a lateral chromatic aberration.
Figure 39:
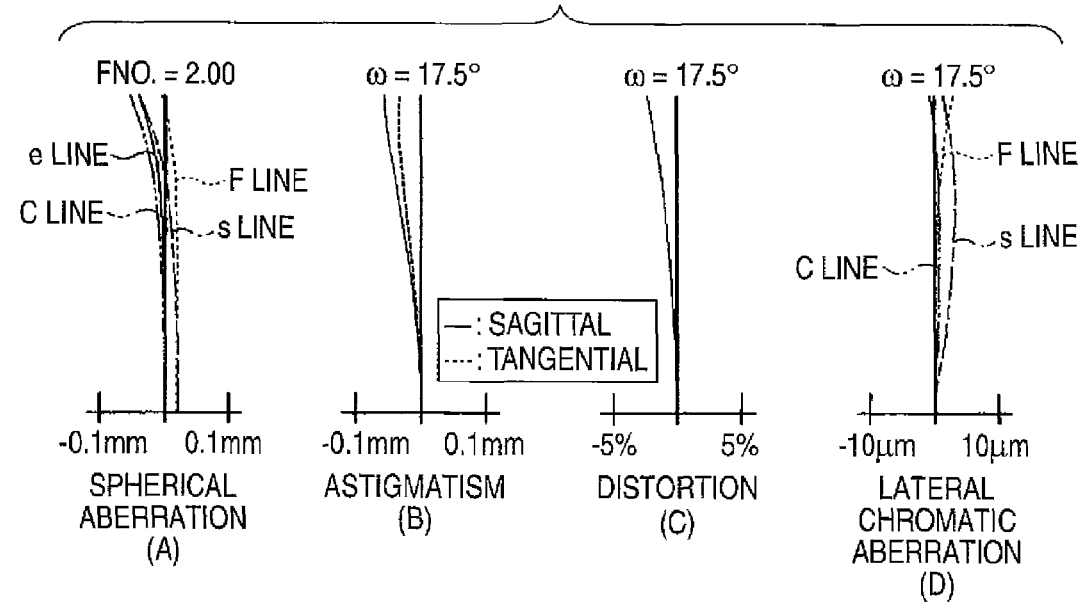
FIG. 39 is an aberration chart showing various aberrations in the imaging lens according to Example 6, (A) showing a spherical aberration, (B) showing an astigmatism, (C) showing a distortion, and (D) showing a lateral chromatic aberration.
Figure 46:
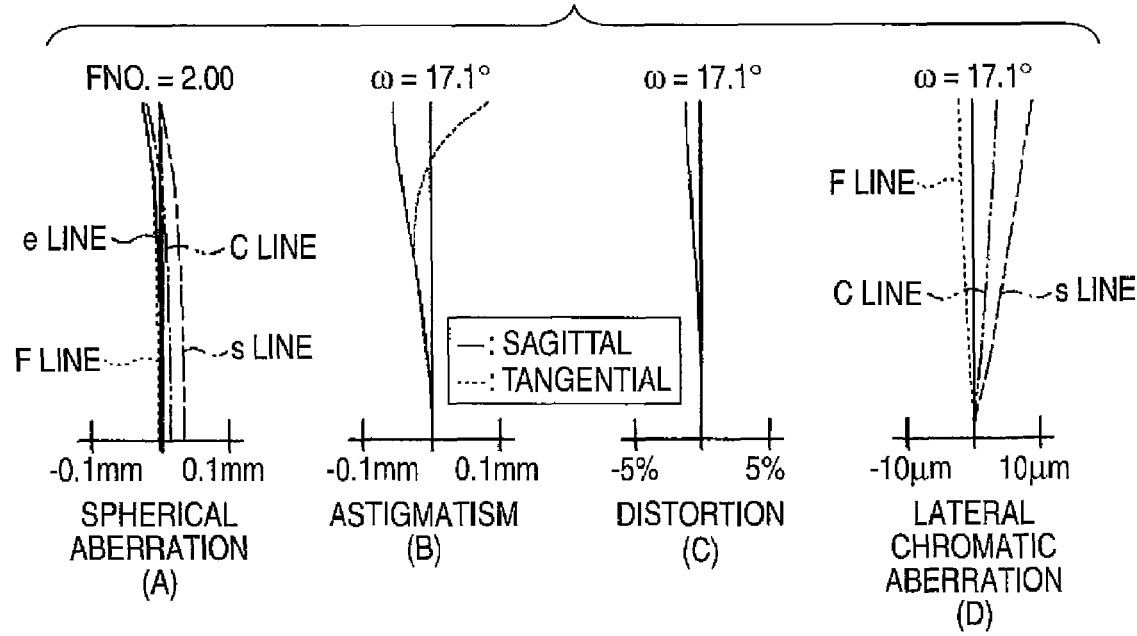
FIG. 46 is an aberration chart showing various aberrations in the imaging lens according to Example 13, (A) showing a spherical aberration, (B) showing an astigmatism, (C) showing a distortion, and (D) showing a lateral chromatic aberration.
Figure 47:
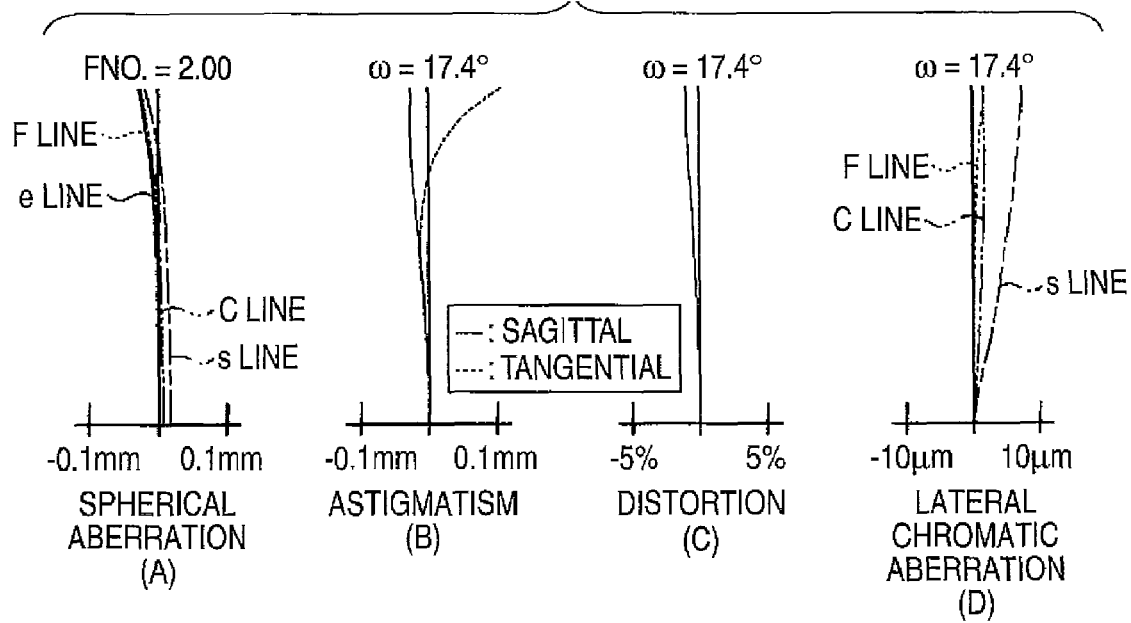
FIG. 47 is an aberration chart showing various aberrations in the imaging lens according to Example 14, (A) showing a spherical aberration, (B) showing an astigmatism, (C) showing a distortion, and (D) showing a lateral chromatic aberration.
Figure 48:
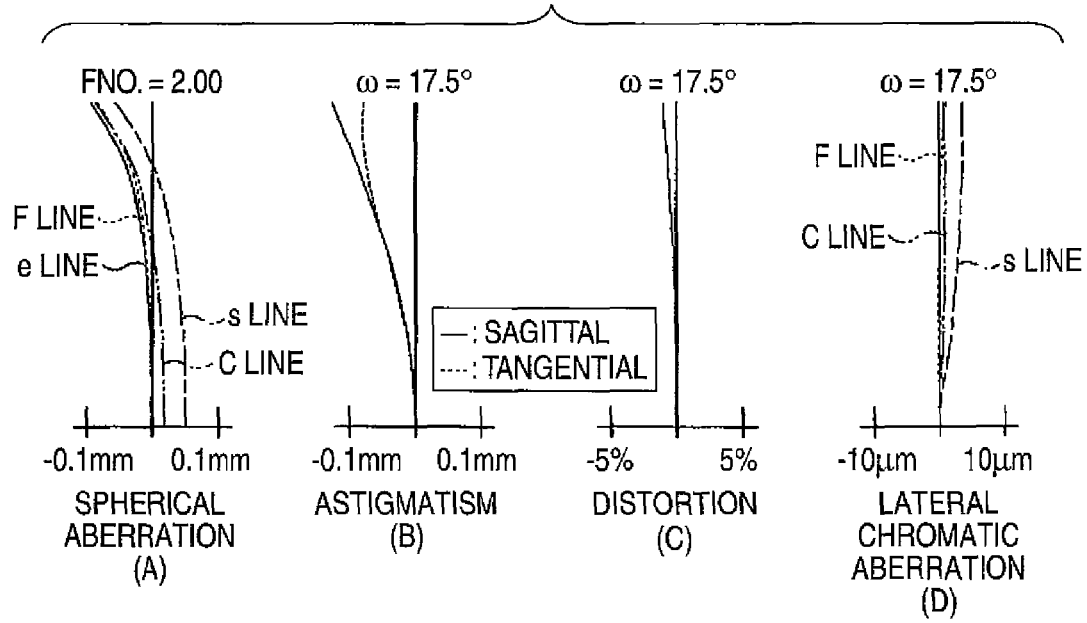
FIG. 48 is an aberration chart showing various aberrations in the imaging lens according to Example 15, (A) showing a spherical aberration, (B) showing an astigmatism, (C) showing a distortion, and (D) showing a lateral chromatic aberration.
Figure 49:
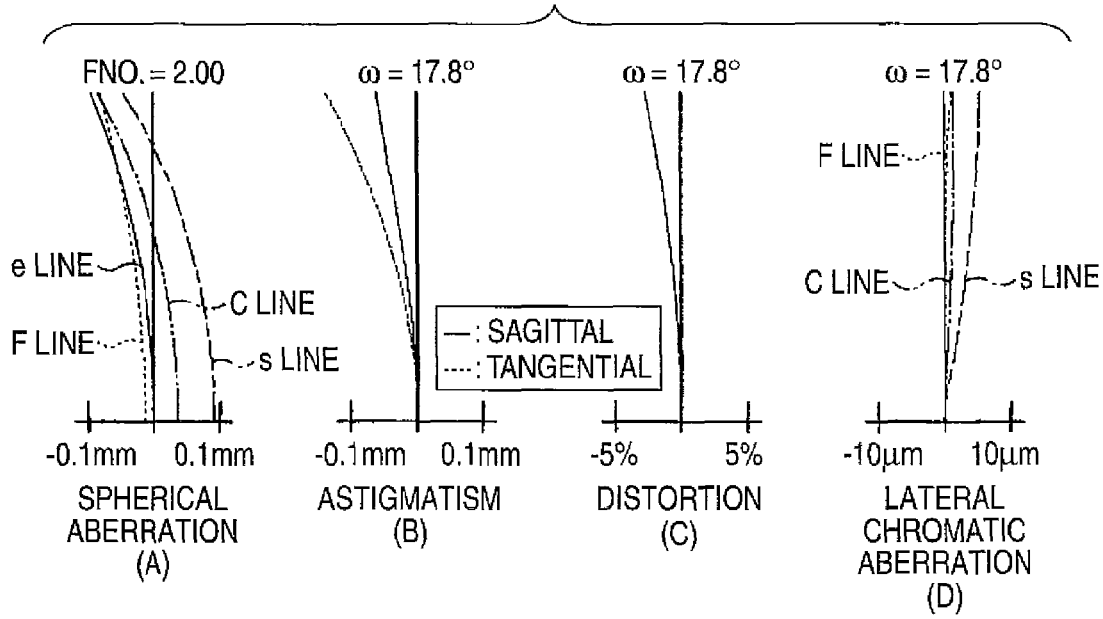
FIG. 49 is an aberration chart showing various aberrations in the imaging lens according to Example 16, (A) showing a spherical aberration, (B) showing an astigmatism, (C) showing a distortion, and (D) showing a lateral chromatic aberration.

Similarly, FIGS. 35(A), (B), (C) and (D) to FIGS. 49(A), (B), (C) and (D) show various aberrations in the imaging lenses according to Examples 2 to 16.

As is apparent from each of the numerical value data and each of the aberration charts, referring to each of Examples, the configuration of each of the lens groups is optimized. Therefore, it is possible to implement a lens system having a suitable reduction in a size and a weight for an onboard camera while holding an excellent optical performance.

The invention is not restricted to the embodiment and each of the examples but various changes can be made. For instance, the values of the radius of curvature, the on-axis surface spacing and the refractive index in each of the lens components are not restricted to the numerical values in the respective examples but take other values.

This application claims foreign priority from Japanese Patent Application No. 2007-93304, filed Mar. 30, 2007, the entire disclosure of which is herein incorporated by reference.

What is claimed is:

1. An imaging lens comprising: in order from an object side of the imaging lens,
a first lens group having a positive power as a whole;
a second lens group including a lens in the most object side thereof, the lens having a concave surface on the object side thereof;
a stop disposed on the object side from the second lens group;
a third lens group including a cemented lens of a lens having a positive power and a lens having a negative power; and
a fourth lens group having a negative power as a whole,
wherein a lens in the most image side of the second lens group has a convex surface on an image side thereof.

2. The imaging lens according to claim 1, wherein
the first lens group includes a lens having a convex surface on the object side thereof and having a positive power,
the second lens group includes a cemented lens, the cemented lens including: in order from the object side, a lens having a concave surface on the object side thereof; and a lens having a convex surface on an image side thereof, and
the fourth lens group includes a lens having a concave surface on the object side thereof and having a negative power.

3. The imaging lens according to claim 1, wherein
the first lens group includes a lens having a convex surface on the object side thereof and having a positive power,
the second lens group includes a meniscus lens having a concave surface on the object side thereof, and
the fourth lens group includes a lens having a concave surface on the object side thereof and having a negative power.

4. The imaging lens according to claim 1, which satisfies condition (2):

$$0.3<|R_{2A}/R_{2B}|<2 \qquad (2)$$

wherein $R_{2A}$ represents a radius of curvature of a surface on the most object side of the second lens group, and $R_{2B}$ represents a radius of curvature of a surface on the most image side of the second lens group.

5. The imaging lens according to claim 1, which satisfies condition (3):

$$|ENP|/L<0.5 \qquad (3)$$

wherein ENP represents a distance from a surface apex on the most object side of the first lens group to an entrance pupil of the imaging lens, and L represents a distance from a surface on the most object side of the first lens group to an imaging surface of the imaging lens.

6. The imaging lens according to claim 1, wherein the lens having a positive power in the cemented lens of the third lens group is a biconvex lens, and the cemented lens satisfies conditions (4) and (5):

$$Nn-Np<0.40 \qquad (4)$$

$$vp/vn>1.0 \qquad (5)$$

wherein Np and vp represent a refractive index and an Abbe number of the biconvex lens at the d-line, respectively, and Nn and vn represent a refractive index and an Abbe number of the lens having a negative power in the cemented lens of the third lens group at the d-line, respectively.

7. The imaging lens according to claim 1, which satisfies condition (6):

$$-6.0 < f4/f < -0.2 \quad (6)$$

wherein f represents a focal length of the imaging lens, and f4 represents a focal length of the fourth lens group.

8. The imaging lens according to claim 1, which satisfies condition (1):

$$2.0 < |f2/f| \quad (1)$$

wherein f represents a focal length of the imaging lens, and f2 represents a focal length of the second lens group.

9. The imaging lens according to claim 8, which satisfies condition (2):

$$0.3 < |R_{2A}/R_{2B}| < 2 \quad (2)$$

wherein $R_{2A}$ represents a radius of curvature of a surface on the most object side of the second lens group, and $R_{2B}$ represents a radius of curvature of a surface on the most image side of the second lens group.

10. The imaging lens according to claim 9, further comprising a stop disposed on the object side from the second lens group.

11. The imaging lens according to claim 10, which satisfies condition (3):

$$|ENP|/L < 0.5 \quad (3)$$

wherein ENP represents a distance from a surface apex on the most object side of the first lens group to an entrance pupil of the imaging lens, and L represents a distance from a surface on the most object side of the first lens group to an imaging surface of the imaging lens.

12. The imaging lens according to claim 11, wherein the lens having a positive power in the cemented lens of the third lens group is a biconvex lens, and the cemented lens satisfies conditions (4) and (5):

$$Nn-Np<0.40 \quad (4)$$

$$vp/vn>1.0 \quad (5)$$

wherein Np and vp represent a refractive index and an Abbe number of the biconvex lens at the d-line, respectively, and Nn and vn represent a refractive index and an Abbe number of the lens having a negative power in the cemented lens of the third lens group at the d-line, respectively.

13. The imaging lens according to claim 12, which satisfies condition (6):

$$-6.0 < f4/f < -0.2 \quad (6)$$

wherein f represents a focal length of the imaging lens, and f4 represents a focal length of the fourth lens group.

14. The imaging lens according to claim 13, wherein
the first lens group includes a lens having a convex surface on the object side thereof and having a positive power,
the second lens group includes a cemented lens, the cemented lens including: in order from the object side, a lens having a concave surface on the object side thereof; and a lens having a convex surface on an image side thereof, and
the fourth lens group includes a lens having a concave surface on the object side thereof and having a negative power.

15. The imaging lens according to claim 13, wherein
the first lens group includes a lens having a convex surface on the object side thereof and having a positive power,
the second lens group includes a meniscus lens having a concave surface on the object side thereof, and
the fourth lens group includes a lens having a concave surface on the object side thereof and having a negative power.

16. An imaging apparatus comprising:
an imaging lens according to claim 1, and
an imaging device for outputting an imaging signal in accordance with an optical image formed by the imaging lens.

17. An imaging apparatus comprising:
an imaging lens according to claim 14, and
an imaging device for outputting an imaging signal in accordance with an optical image formed by the imaging lens.

18. The imaging lens according to claim 1, wherein the lens having a positive power in the cemented lens of the third lens group is a biconvex lens, and the cemented lens satisfies condition (4):

$$0.01 \leq Nn-Np<0.40 \quad (4)$$

wherein Np represents a refractive index of the biconvex lens at the d-line, and Nn represents a refractive index of the lens having a negative power in the cemented lens of the third lens group at the d-line.

19. The imaging lens according to claim 1, wherein the lens having a positive power in the cemented lens of the third lens group is a biconvex lens, and the cemented lens satisfies condition (5):

$$vp/vn>1.56 \quad (5)$$

wherein vp represents an Abbe number of the biconvex lens at the d-line, and vn represents an Abbe number of the lens having a negative power in the cemented lens of the third lens group at the d-line.

* * * * *